United States Patent
Tatsumi

(10) Patent No.: US 8,051,371 B2
(45) Date of Patent: Nov. 1, 2011

(54) DOCUMENT ANALYSIS SYSTEM AND DOCUMENT ADAPTATION SYSTEM

(75) Inventor: Yuushin Tatsumi, Tokyo (JP)

(73) Assignee: NEC Corporation, Tokyo (JP)

( * ) Notice: Subject to any disclaimer, the term of this patent is extended or adjusted under 35 U.S.C. 154(b) by 1133 days.

(21) Appl. No.: 11/577,984

(22) PCT Filed: Oct. 25, 2005

(86) PCT No.: PCT/JP2005/019531
§ 371 (c)(1),
(2), (4) Date: Apr. 25, 2007

(87) PCT Pub. No.: WO2006/046523
PCT Pub. Date: Apr. 5, 2006

(65) Prior Publication Data
US 2008/0148144 A1    Jun. 19, 2008

(30) Foreign Application Priority Data

Oct. 25, 2004   (JP) ................................ 2004-310238

(51) Int. Cl.
*G06F 17/00*   (2006.01)
(52) U.S. Cl. ........ 715/234; 715/235; 715/243; 715/244; 715/245
(58) Field of Classification Search .................. 715/235, 715/234, 246, 247, 251, 243–245
See application file for complete search history.

(56) References Cited

U.S. PATENT DOCUMENTS

| | | | | |
|---|---|---|---|---|
| 7,493,557 B2* | 2/2009 | Shima | .......................... | 715/234 |
| 2003/0222921 A1* | 12/2003 | Rummel | ....................... | 345/788 |
| 2004/0100509 A1* | 5/2004 | Sommerer et al. | ............ | 345/864 |
| 2004/0243936 A1* | 12/2004 | Fukuda | ......................... | 715/523 |
| 2006/0271847 A1* | 11/2006 | Meunier | ....................... | 715/517 |
| 2006/0282444 A1* | 12/2006 | Chen et al. | .................... | 707/100 |
| 2007/0118797 A1* | 5/2007 | Layzell | ......................... | 715/517 |

FOREIGN PATENT DOCUMENTS

| | | |
|---|---|---|
| EP | 1426874 A1 | 6/2004 |
| JP | 7-282053 A | 10/1995 |
| JP | 9-251457 A | 9/1997 |
| JP | 10-289252 A | 10/1998 |
| JP | 11-203285 A | 7/1999 |

(Continued)

*Primary Examiner* — Chau Nguyen
(74) *Attorney, Agent, or Firm* — Sughrue Mion, PLLC

(57) ABSTRACT

A document analysis system which can execute a layout analysis intended by a document provider and an exhaustive title analysis and output the analysis result which can be used by a third person is provided by the present invention. The input unit (11) obtains a structured or semi-structured document and renders it. The basic layout analysis unit (14) obtains the rendering result and analyzes the layout by grouping document description elements juxtaposed in a determined direction by referencing an arrangement of the document description elements. The title analysis unit (15) obtains the rendering result and a title analysis rule from the title analysis rule storing unit (23) and analyzes the title by comparing the name, attribute, style or the content of the document analysis elements with the title analysis rule. The layout analysis unit (16) obtains the layout components and the hierarchical relationship thereof and the titles for generating a new layout by grouping the layout components. The output unit (13) obtains the layout components and the hierarchical relationship thereof, the relationship between the components and the titles, shapes them into a format having an expression which uses the reference to the document description elements and output them.

27 Claims, 44 Drawing Sheets

FOREIGN PATENT DOCUMENTS

| | | |
|---|---|---|
| JP | 2000-99512 A | 4/2000 |
| JP | 2000-148788 A | 5/2000 |
| JP | 2000-172680 A | 6/2000 |
| JP | 2000-357170 A | 12/2000 |
| JP | 2001-184344 A | 7/2001 |
| JP | 2003-85159 A | 3/2003 |
| JP | 2003-85160 A | 3/2003 |
| JP | 2003-288334 A | 10/2003 |
| JP | 2003-330856 A | 11/2003 |
| JP | 2004-38827 A | 2/2004 |
| JP | 2004-86855 A | 3/2004 |
| JP | 2004-139275 A | 5/2004 |
| JP | 4124261 | 5/2008 |

* cited by examiner

Fig. 10

```
<rdf:RDF
  xmlns= "http://purl.org/rss/1.0/"
  xmlns:rdf= "http://www.w3c.org/1999/02/22-rdf-syntax-ne#"
  xmlns:layout= "http://www.nec.co.jp/layout/"
  xml:lag="ja">

<channel rdf:about= "http://www.nec.co.jp/">
    <title> NEWS</title>
    <link> http://www.nec.co.jp/ </link>
    <description> </description>
    <items>
      <rdf:Seq>
        <rdf:li rdf:resource="urn:layout:1"/>
        <rdf:li rdf:resource="urn:layout:2"/>
        <rdf:li rdf:resource="urn:layout:3"/>
        <rdf:Seq>
          <rdf:li rdf:resource="urn:layout:3:1"/>
          <rdf:li rdf:resource="urn:layout:3:2"/>
        </rdf:Seq>

<rdf:li rdf:resource="urn:layout:4:1">
        </rdf:Seq>
          <rdf:li rdf:resource="urn:layout:4:1"/>
          <rdf:li rdf:resource="urn:layout:4:2"/>
        </rdf:Seq>
        </rdf:li>
      </rdf:Seq>
    </items>
  </channel>
```
⎫ HIERARCHY INDICATING PART

```
<item rdf:about="urn:layout:1">   REFERENCE OF HTML
  <title> </title>                ELEMENT IN ORIGINAL
  <link> urn:layout:1</link>      HTML DOCUMENT IS USED
  <layout:element>
    <layout:field> /body[1]/h1[1] <layout:field>
    <layout:head> <layout:head>
  </layout:element>
</item>
...
<item rdf:about= "urn:layout:3">
  <title> </title>
  <link> urn:layout:3</link>
  <layout:element>
    <layout:field> /body[1]/table[2]/tr[1]/td[1],
          body[1]/table[2]/tr[1]/td[2]/<layout:firld>
    <layout:head> <layout:head>
  </layout:enement>
</item>
...
</rdf:RDF>
```
⎫ COMPONENT INDICATING PART

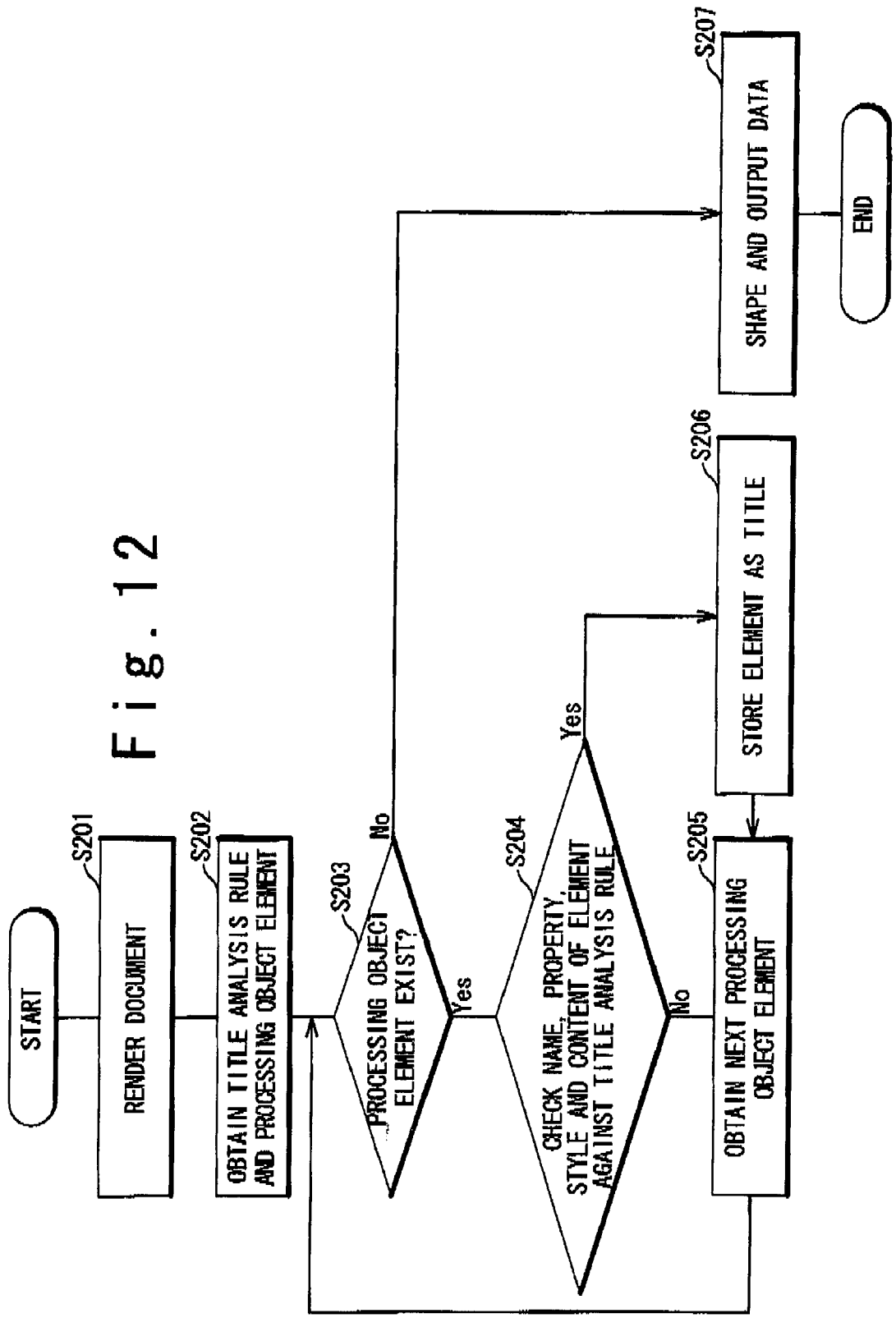

Fig. 13

NAME IS IN h1 or h2 or h3 or h4 or h5 r h6) AND (STYLE IS DISPLAYED)
NAME IS IN img) AND (PROPERTY IS URL WITHOUT PREDETERMINED URL) AND (STYLE IS DISPLAYED)
(NAME IS IN img) AND (PROPERTY IS NOT ANIMATION GIF) AND (STYLE IS DISPLAYED)
(STYLE IS DISPLAYED) AND (BACKGROUND COLOR IS SET IN STYLE) AND (HEIGHT OF STYLE IS NOT OVER 100 PX) AND
(MORE THAN TWO CHARACTERS ARE IN CONTENT)
(STYLE IS DISPLAYED) AND (BACKGROUND IMAGE IS SET IN STYLE) AND (HEIGHT OF STYLE IS NOT OVER 100 PX) AND
(MORE THAN TWO CHARACTERS ARE IN CONTENT)
(STYLE IS DISPLAYED) AND (STYLE IS TEXT, SIZE IS MORE THAN 20 PX) AND
(MORE THAN TWO CHARACTERS ARE IN CONTENT)
(STYLE IS DISPLAYED) AND (STYLE IS TEXT WITH DECORATION) AND
(MORE THAN TWO CHARACTERS ARE IN CONTENT)

Fig. 15

```
<rdf:RDF
 xmlns= "http://purl.org/rss/1.0/"
 xmlns:rdf= "http://www.w3c.org/1999/02/22-rdf-syntax-ne#"
 xmlns:layout="http://www.nec.co.jp/layout/"
 xml:lang="ja">

<channel rdf:about="http://www.nec.co.jp/">
   <title> NEWS </title>
   <link> http://www.nec.co.jp/</link>
   <description> </description>
   <items>
     <rdf:Seq>
       <rdf:li rdf:resource= "urn:layout:1"/>
       <rdf:li rdf:resource= "urn:layout:2"/>
   </items>
 </channel>

<item rdf:about= "urn:layout:1">
   <title>NEWS</title>
   <link>urn:layout:1</link>
   <layout:element>
     <layout:field></layout:field>
     <layout:head>/body[1]/h1[1]</layout:head>
   </layout:element>
 </item>
 ...
 </item rdf:about="urn:layout:2">
   <title>SPORT</title>
   <link>urn:layout:2</link>
   <layout:element>
     <layout:field></layout:field>
     <layout:head>/body[1]/table[2]/tr[1]/td[1]</layout:head>
   </layout:element>
 </item>
 ...
</rdf:RDF>
```

REFERENCE OF HTML ELEMENT IN ORIGINAL HTML DOCUMENT IS USED

COMPONENT INDICATING TITLE

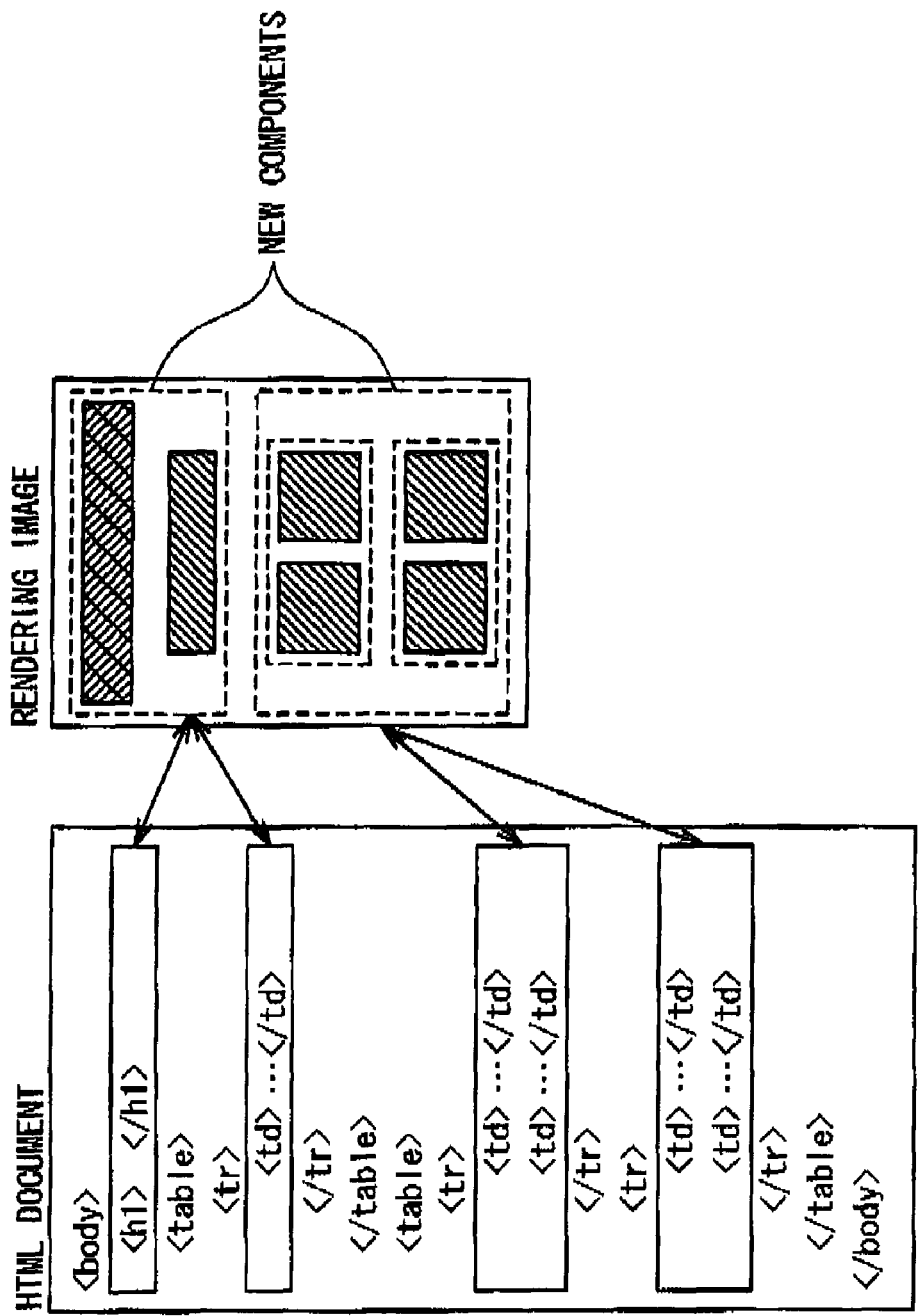

Fig. 21

```
<rdf:RDF
  xmlns= "http://purl.org/rss/1.0/"
  xmlns:rdf= "http://www.w3c.org/1999/02/22-rdf-syntax-ne#
  xmlns:layout= "http://www.nec.co.jp/layout/"
  xml:lag="ja">

<channel rdf:about="http://www.nec.co.jp/" >
    <title>NEWS</title>
    <link> http://www.nec.co.jp/</link>
    <description> </description>
    <items>
      <rdf:Seq>
        <rdf:li rdf:resource="urn:layout:1" />
        <rdf:li rdf:resource="urn:layout:2" />
        <rdf:Seq>
          <rdf:li rdf:resource= "urn:layout:2:1" />
          <rdf:li rdf:resource= "urn:layout:2:2" />
        </rdf:Seq>
        </rdf:li>
      </rdf:Seq>
    </items>
  </channel>
```
} HIERARCHY INDICATING PART

```
  <item rdf:about="urn:layout:1" >
    <title>NEWS </title>
    <link> urn:layout:1</link>
    <layout:element>
        <layout:field>/body[1]/h1[1],h1[1],body[1]/table[1]/tr[1]/td[1]<layout:field>
        <layout:head>/body[1]/h1[1]</layout:head>
    </layout:element>
  </item>
  ...
  <item rdf:about=urn:layout:2 ">
    <title>SPORT</title>
    <link> urn:layout:2</link>
    <layout:element>
        <layout:field> /body[1]/table[2]/tr[1]/td[1],body[1]/tabe[2]/tr[1]/td[2],
           /body[1]/table[2]/tr[2]/td[1],/body[1]/table[2]/tr[2]/td[2]<layout:field>
        <layout:hrad>/body[1]/table[2]/tr[1]/td[1]<layout:hrad>
    </layout:enement>
  </item>
  ...
</rdf:RDF>
```
} COMPONENT AND TITLE INDICATING PART

Fig. 24A

HTML DOCUMENT (URL http://www.nec.co.jp/news.html)

```
<html>
<head>
   <title> NEWS </title>
   <link rel= altern ate "type=" application/rdf+xml"
href="http://www.nec.co.jp/news.rdf"/>
</head>
<body>
   <h1> HEADLINES </h1>
   <table>
      <tr>
         <td> INAUGURATION OF OLYMPIC</td>
      </tr>
   </table>
   <table>
      <tr>
         <td>
            <table>
               <tr><td> POLITICS </tr></tr>
               <tr><td> TRIUMPH OF ** PARTY </tr></tr>
            </table>
         </td>
         <td>
            <table>
               <tr><td> BUSINESS </td></tr>
               <tr><td> 2% RISE OF GDP</td></tr>
            </table>
         </td>
      </table>
   </body>
</html>
```

Fig. 24B

XML DOCUMENT(URL http://www.nec.so.jp/nes.rdf)

```
<rdf:RDF
  xmln="http://pirl.org/rss/1.0/"
  xmlns:rdf="http://www.w3c.org/1999/02/22-rdf-syntax-ne#"
  xmlns:layout="http://www.nec.co.jp/layout/"
  xml:lang="ja">

<channel rdf:about="http://www.nec.co.jp/news.html">
      <title>NEWS</title>
      <link>http://www.nec.co.jp/news.html</link>
      <description></description>
      <items>
          <rdf:Seq>
              <rdf:li rdf:resource="urn:layout:1"/>
              <rdf:li rdf:resource="urn:layout:2">
                  <rdf:Seq>
                      <rdf:li rdf:resource="urn:layout:2:1"/>
                      <rdf:li rdf:resource="urn:layout:2:2"/>
                  <rdf:Seq>
              </rdf:li>
          </rdf:Seq>
      </items>
  </channel>

<item rdf:about="urn:layout:1">
      <title>NEWS</title>
      <link>urn:layout:1</link>
      <layout:element>
          <layout:field>/body[1]/h1[1],body[1]/table[1]/</layout:field>
          <layout:head>/body[1]/h1[1]/</layout:head>
      </layout:element>
  </item>
  <item rdf:about="urn:layout:2">
      <title></title>
      <link>urn:layout:2</link>
      <layout:element>
          <layout:field>/body[1]/table[2]</layout:field>
          <layout:head></layout:head>
      </layout:element>
  </item>
  <item rdf:about="urn:layout:2:1">
      <title></title>
      <link>urn:layout:2:1</link>
      <layout:element>
          <layout:field>/body[1]/table[2]/tr[1]/td[1]</layout:field>
          <layout:head>/body[1]/table[2]/tr[1]/td[1]/table[1]/tr[1]</layout:head>
      </layout:element>
  </item>
  <item rdf:about="urn:layout:2:2">
      <title></title>
      <link>urn:layout:2:2</link>
      <layout:element>
          <layout:field>/body[1]/table[2]/tr[1]/td[2]</layout:field>
          <layout:head>/body[1]/table[2]/tr[1]/td[2]/table[1]/tr[1]</layout:head>
      </layout:element>
  </item>
<rdf:RDF>
```

Fig. 29 http://www.nec.co.jp/news.html,urn:layout:2:1
http://www.nec.co.jp/stock.html,urn:layout:1

Fig. 30A

HTML DOCUMENT (URL http://www.nec.co.jp/stock.html)

```
<html>
<head>
  <title>NEWS</title>
  <link rel= "altern ate" type="application/rdf+xml"
href= "http://www.nec.co.jp/stock.rdf"/>
</head>
<body>
  <title>
    <tr>
      <td> NIKKEI STOCK AVERAGE </td>
      <td> ¥11,000 </td>
    </tr>
  </title>
  <title>
    <tr>
      <td> MARKET OVERVIEW </td>
      <td> FIRST QUARTER CURRENT PROFIT: 150% </td>
      <td> FALL CONTINUOUSLY IN RESPONSE TO THE LOW STOCK PRICE OF U.S. </td>
    </tr>
  </table>
</body>
</html>
```

Fig. 30B

```
XML DOCUMENT(URL http://wwww.nec.so.jp/nes.rdf)
<rdf:RDF
  xmln="http://pirl.org/rss/1.0/"
  xmlns:rdf="http://www.w3c.org/1999/02/22-rdf-syntax-ne#"
  xmlns:layout="http://www.nec.co.jp/layout/"
  xml:lang="ja" >

<channel rdf:about="http://www.nec.co.jp/news.html">
    <title>NEWS</title>
    <link>http://www.nec.co.jp/news.html</link>
    <description></description>
    <items>
      <rdf:Seq>
        <rdf:li rdf:resource="urn:layout:1"/>
        <rdf:li rdf:resource="urn:layout:2"/>
        <rdf:Seq>
      </rdf:Seq>
    </items>
  </channel>

<item rdf:about="urn:layout:1">
    <title> NIKKEI STOCK AVERAGE</title>
    <link>urn:layout:1</link>
    <layout:element>
      <layout:head>/body[1]/h1[1]/</layout:head>
      <layout:field>/body[1]/h1[1],body[1]/table[1]/</layout:field>
    </layout:element>
  </item>
  <item rdf:about="urn:layout:2" >
    <title> MARKET OVERVIEW</title>
    <link>urn:layout:2</link>
    <layout:element>
      <layout:field>/body[1]/table[2]</layout:field>
      <layout:field>/body[1]/h1[1],body[1]/table[1]/</layout:field>
    </layout:element>
  </item>

<rdf:RDF>
```

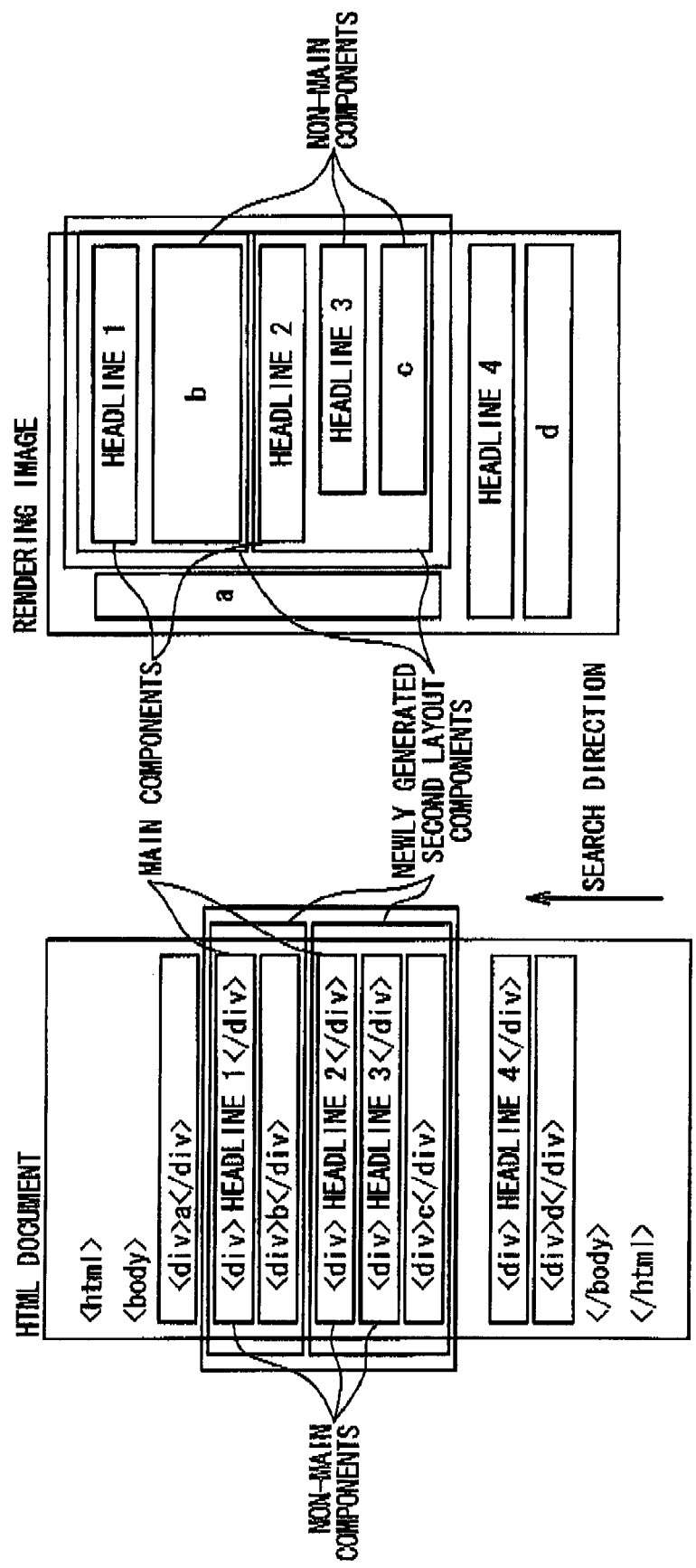

DOCUMENT ANALYSIS SYSTEM AND DOCUMENT ADAPTATION SYSTEM

TECHNICAL FIELD

The present invention relates to a document analysis system, a document analysis method and a document analysis program to allow a layout analysis from a structured/semi-structured document, and a document adaptation system, a document adaptation method and a document adaptation program to allow adaptation of a structured/semi-structured document into an environment by utilizing a layout.

BACKGROUND ART

In a conventional document analysis system and document adaptation system, a layout is analyzed using a section strength of document description elements, and display regions are allocated to the components of the analyzed layout to display information of the components under desired displaying condition such as an enlarged image in respective display regions, and to selectively display titles of the components in respective display regions, in order to realize a display of a structured/semi-structured document under desired display conditions while maintaining a layout thereof (see Japanese Laid-Open Patent Application JP-P2001-184344A).

The document description element is an element which is a description unit of the structured/semi-structured document, exemplified by an element of the HTML tag such as a TABLE element and an A element in the HTML document. The layout component is a partial region including the display of related information to compose a part of a display screen, indicating a partial region made by related information of a certain headline in the HTML document for example.

Moreover, in order to generate a document applicable to the screen display, an index document is generated from the document description elements with a specific name in accordance with a rule using the name of the document description elements, and a document which describes index item contents is generated (see Japanese Laid-Open Patent Application JP-A-Heisei, 9-251457).

Furthermore, in order to generate a document desired by a user, a composite document made by necessary information is generated in accordance with the URL of the structured/semi-structured document, reference to document description elements indicating a part in which necessary information of respective documents exists, and a rule related to a region to display the necessary information (see Japanese Laid-Open Patent Application JP-P2004-139275A).

In relation to the present invention, Japanese Laid-Open Patent Application JP-A-Heisei, 10-289250 discloses a technique to allow intuitive recognition of a page exhibited in a registered URL page by displaying not only title information but also image information when a list of registered URLs is displayed.

Japanese Laid-Open Patent Application JP-A-Heisei, 11-203285A discloses a technique to determine a line property indicating a position of a document element within a line for respective lines and determine a meaning of the document element for respective lines on the basis of a meaning of each of morphemes to compose the document element and a line property of a line to which the document element belongs, so as to give a precise meaning to respective document elements of the original document.

Japanese Laid-Open Paten Application JP-P2003-85159A discloses a technique to prepare an index automatically by analyzing a top document of a group of desired structured documents and compose the index with image data of a related document, in order to present a document which is easy to read to the user.

Japanese Laid-Open Paten Application JP-P2004-86855 discloses a technique to facilitate preparation and editing of the document referring to contents and index of the document mutually. To be more specific, in this known technique, a link to generate document content information corresponding to index items is embedded when a document index is generated. Thereafter, the document content information containing the index items is generated by indicating the link. In generating the information, a link to instruct an output of the index is embedded in the document content information. The index containing the index items corresponding to the document contents is generated by indicating the link in the document content information. In this case, the links to generate the document content information corresponding to the index items are embedded in the index.

Japanese Laid-Open Paten Application JP-P2003-288334 discloses a technique to generate a structured document with attached tags from a printed document composed of a plurality of pages with high accuracy.

Japanese Laid-Open Paten Application JP-P2003-330856 discloses a technique to allow an improved access to both local information and global information of contents by generating a layout and adjusting the information granularity dynamically in accordance with an operation to modify a zoom factor.

The first problem in the conventional techniques is that it is often impossible to analyze the layout of the structured/semi-structured document intended by a document provider by the conventional document analysis systems. It is because the layout intended by the document provider cannot be analyzed in a layout analysis using the strength of the section of the document description elements due to the variety of document description formats.

The second problem in the conventional techniques is that only a part of the titles of the structured/semi-structured documents can be analyzed in conventional document analysis systems. It is because the title of the structured/semi-structured document is usually expressed by a name, property, style and content of the document description element, and the conventional title analysis based on a rule which uses only the name of the document description element can not analyze the entire title.

The third problem in the conventional techniques is that a third person can not use the analyzed layout information for developing application software by using the conventional document analysis system of structured/semi-structured documents. It is because the conventional document analysis system does not output analyzed layout information in a format which can be utilized by a third person.

The fourth problem in the conventional techniques is the difficulty to make documents adapt to the environments of networks, terminals or users in accordance with the logical structure of the document which the document provider intended. It is because only a part of the title can be analyzed when the document index is generated in accordance with the rule using the name of the document description element, so that it is impossible to generate the index document precisely. Moreover, in the case of generating the composite document in accordance with a rule defined by the user using a URL (uniform resource locator) of the document and reference to the document description element indicating a part in which necessary information of the document exists, there is a case that the composite document desired by the user cannot be generated precisely at the time of renewing the document, and the rule as described above prevents the logical structure of the document intended by the document provider from being represented precisely.

DISCLOSURE OF INVENTION

The first object of the present invention is to provide a document analysis system which allows an analysis of the layout intended by the document provider.

The second object of the present invention is to provide a document analysis system which allows a comprehensive analysis of a title.

The third object of the present invention is to provide a document analysis system allowing an output of layout information in a format which can be utilized by third person for application software developments.

The fourth object of the present invention is to provide a document adaptation system which allows adaptations of a document into the environments of networks, terminals and users by capturing the logical structure of a document intended by the document provider precisely.

According to one aspect of the present invention, the document analysis system includes a basic layout analysis unit, wherein an arrangement of document description elements included in a structured document or a semi-structured document is referred to analyze a layout of the structured document or the semi-structured document by grouping the document description elements juxtaposed in a determined direction.

The document analysis system according to the present invention includes a title analysis rule storage unit to store a title analysis rule based on any one or more values of the name, property, style and contents of the document description elements of the structured document or the semi-structured document, a title analysis unit to analyze a title by comparing any one or more of the name, property, style and contents of the document description elements included in a structured document or a semi-structured document with the title analysis rule, and a layout analysis unit to generate a new layout by grouping components of the layout using the layout analyzed in the basic layout analysis and the title analyzed in the title analysis unit.

In the document analysis system of the present invention, the layout analysis unit includes a block selection unit to select a main component of the layout using the layout analyzed in the basic layout analysis unit, the title analyzed in the title analysis unit, and the new layout analyzed in the layout analysis unit, and a section calculation unit to generate a new layout by grouping the layout components using the layout analyzed in the basic layout analysis unit, the new layout analyzed in the layout analysis unit, and the main component of the layout selected in the block selection unit.

In the document analysis system of the present invention, the basic layout analysis unit refers to an arrangement of the document description elements under the grouped document description elements, so as to analyze a layout by repeating the process of grouping the document description elements juxtaposed in a direction orthogonal to a direction which was used for the immediately preceding grouping process for a predetermined number of times.

In the document analysis system of the present invention, the basic layout analysis unit refers to an arrangement of the document description elements under the grouped document description elements, so as to analyze a layout of a subsequent hierarchy by repeating the process of grouping the document description elements juxtaposed in a direction orthogonal to a direction which was used for the immediately preceding grouping process for a predetermined number of times.

In the document analysis system of the present invention, the basic layout analysis unit exclusively refers to an arrangement of partial document description elements specified among the document description elements.

According to another aspect of the present invention, the document analysis system includes the title analysis rule storage unit to store the title analysis rule based on any one or more values of the name, property, style and contents of document description elements of the structured document or the semi-structured document, and a title analysis unit to analyze a title by comparing any one or more of the name, property, style and contents of the document description elements included in the structured document and the semi-structured document with the title analysis rule.

According to yet another aspect of the present invention, the document analysis system includes an output unit to execute an output by shaping a layout and title of a structured document or a semi-structured element into a format expressed referring to document description elements included in the structured document and the semi-structured document.

According to a further aspect of the present invention, the document adaptation system of the present invention includes an index document output unit to generate and output an index document using the structured document or the semi-structured document, and a document describing layout information of the structured document or the semi-structured document, and an item document output unit to generate and output a document describing index item contents using the structured document or the semi-structured document and the document describing the layout information.

According to a yet further aspect of the present invention, the document adaptation system of the present invention includes an output component information storage unit to store a group of combinations between the URI (universal resource identifier) of the structured document or the semi-structured document, and an ID of an output component of the structured document or the semi-structured document as output component information, and a composite document output unit to generate and output a composite document using the output component information, the structured document or the semi-structured document corresponding to the URI described in the output component information, and a document which describes layout information corresponding to the structured document or the semi-structured document.

The document analysis method and the document analysis program according to the present invention includes a step to refer to an arrangement of document description elements included in a structured document or a semi-structured document so as to analyze a layout of the structured document or the semi-structured document by grouping the document description elements juxtaposed in a determined direction.

The document analysis method and the document analysis program according to the present invention includes a step to store a title analysis rule based on any one or more values of the name, property, style and contents of the document description elements of the structured document or the semi-structured document, a step to analyze a title by comparing any one or more of the name, property, style and contents of the document description elements included in the structured document or the semi-structured document with the title analysis rule, and a step to generate a new layout by grouping components of the layout using the analyzed layout and the analyzed title.

The document analysis method and the document analysis program according to the present invention includes, in the step to analyze the layout, a step to analyze the layout by repeating the process of grouping the document description elements juxtaposed in the direction orthogonal to a direction which was used for an immediately preceding grouping process for a predetermined number of times, referring to an arrangement of the document description elements under the grouped document description elements.

The document analysis method and the document analysis program according to the present invention includes, in the step to analyze the layout, a step to analyze a layout of a subsequent hierarchy by repeating the process of grouping the document description elements juxtaposed in a direction orthogonal to a direction which was used for an immediately previous grouping process for a predetermined number of times, referring to an arrangement of the document description elements under the grouped document description elements.

The document analysis method and the document analysis program according to the present invention refers to an arrangement of partial document description elements exclusively specified among the document description elements, in the step to analyze the layout.

The document analysis method and the document analysis program according to the present invention includes a step to store a title analysis rule based on any one or more values of the name, property, style and contents of document description elements of a structured document or a semi-structured document, and a step to analyze a title by comparing any one or more of the name, property, style and contents of the document description elements included in the structured document or the semi-structured document with the title analysis rule.

The document analysis method and the document analysis program according to the present invention includes a step to execute an output by shaping a layout and title of a structured document or a semi-structured document into a format expressed by reference to document description elements included in the structured document or the semi-structured document.

The document adaptation method and the document adaptation program according to the present invention includes a step to generate and output an index document using a structured document or a semi-structured document and the document describing layout information of the structured document or the semi-structured document, and a step to generate and output a document describing index item contents using the structured document or the semi-structured document and the document describing the layout information.

The document adaptation method and the document adaptation program according to the present invention includes a step to store a group of combinations between a URI of a structured document or a semi-structured document and an ID of an output component of the structured document or the semi-structured document as output component information in the output component information storage unit, and a step to generate and output a composite document using the output component information, the structured document or the semi-structured document corresponding to the URI described in the output component information, and a document describing layout information corresponding to the structured document or the semi-structured document.

The first effect of the present invention is to allow an analysis of the layout intended by the document provider. It is because the layout is analyzed on the basis of an arrangement of document description elements. It is also because a layout analyzed on the basis of an arrangement of document description elements, and a title analyzed using the property, style and contents as well as the name of the document description elements are used to group components of the previously analyzed layout so that a new layout is generated which is composed of new components which is a group of related components with the title or the like as a key.

The second effect of the present invention is to allow a comprehensive analysis of a title. It is because a title is analyzed based on the names, properties, styles and contents of document description elements.

The third effect of the present invention is to allow presentation of layout information in a format which can be easily utilized by a third person for application software developments. It is because an analyzed layout and title are outputted in a format which expresses components of the layout and the title by using reference of document description elements.

The fourth effect of the present invention is that a document adaptive to the environments of networks, terminals and users is provided by utilizing the logical structure of the document intended by the document provider. It is because the layout information which reflects the logical structure of the document intended by the document provider is utilized for providing the structured/semi-structured document adaptive to the environments.

Additionally, the present invention can be applied for document browsing systems which realize various functions, such as a function to output a document summary, a function to read aloud, and a function to display document items selectively, and a program for realizing the document browsing system in a computer, by utilizing the logical structure of a document. The present invention can also be applied to a document conversion system utilizing the logical structure of documents to realize various functions such as a function to generate a document summary, a function to divide a document in accordance with the summary, and a function to composite document items selectively, and a program for realizing a document conversion system in a computer.

BRIEF DESCRIPTION OF THE DRAWINGS

FIG. 10 is a diagram showing an example of an output format in the first embodiment of the present invention;

FIG. 12 is a flowchart showing an operation of the embodiment to realize the second invention of the present invention;

FIG. 13 is a diagram showing an example of a title analysis rule in the second embodiment of the present invention;

FIG. 15 is a diagram showing an example of an output format in the second embodiment of the present invention;

FIG. 20 is a diagram to explain the third embodiment of the present invention;

FIG. 21 is a diagram showing an example of an output format in the third embodiment of the present invention;

FIG. 24A is a diagram showing an HTML document among examples of HTML document and XML document;

FIG. 24B is a diagram showing an XML document among examples of HTML document and XML document;

FIG. 29 is a diagram showing an example of information related to output components in the fifth embodiment of the present invention;

FIG. 30A is a diagram showing an HTML document among examples of HTML document and XML document;

FIG. 30B is a diagram showing an XML document among examples of HTML document and XML document;

FIG. 45 is a diagram to explain the sixth implementation example of the present invention.

BEST MODE FOR CARRYING OUT THE INVENTION

Figure 1:
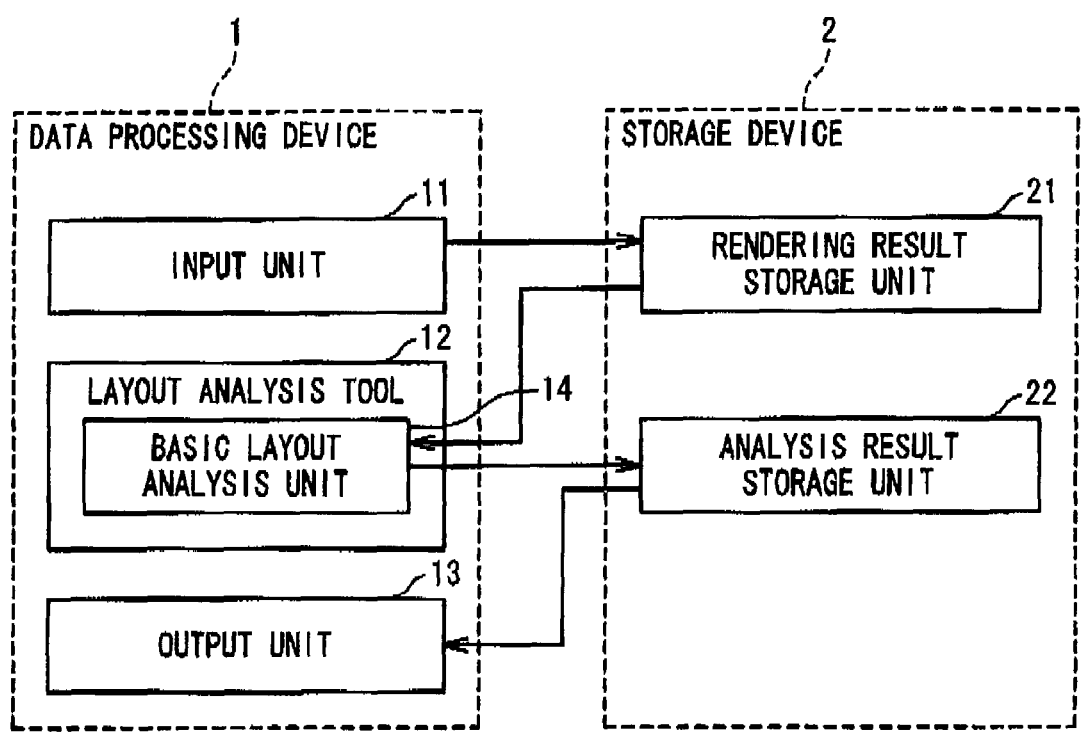
FIG. 1 is a block diagram showing a configuration of an embodiment to realize the first invention of the present invention.

The embodiments of the present invention will be explained below referring to the attached drawings. Referring to FIG. 1, the system according to the first embodiment of the present invention includes a data processing device 1 operated by a program control, and a storage device 2 which stores information.

The data processing device 1 is provided with an input unit 11, a layout analysis tool 12, and an output unit 13. The storage device 2 is provided with a rendering result storage unit 21, and an analysis result storage unit 22.

The input unit 11 obtains a structured/semi-structured document from an outside, renders the document, and the rendering result is stored in the rendering result storage unit 21. The layout analysis tool 12 has a basic layout analysis unit 14. The output unit 13 obtains information of layout components and a hierarchical relationship thereof from the analysis result storage unit 22, and shapes the layout components into a format expressed by using reference of the document description elements in order to output externally. The output here may be achieved by giving IDs to the layout components.

The basis layout analysis unit 14 obtains rendering results from the rendering result storage unit 21, and refers an arrangement of document description elements so as to analyze the layout by grouping the document description elements juxtaposed in a determined direction. To be more specific, referring to an arrangement of specified document description elements such as document description element which is the root and document description elements belonging to layout components which were already analyzed, the document description elements juxtaposed in a determined direction are formed into a group. The grouped document description elements and ungrouped document description elements having no child document description element are stored in the analysis result storage unit 22 as layout components. In the ungrouped document description elements, the process is recursively and repeatedly applied to the children of the ungrouped document description elements, until all document description elements are formed into groups, or until no more child document description element exists.

The rendering result storage unit 21 stores processing results of the input unit 11, and the analysis result storage unit 22 stores processing results of the layout analysis tool 12, respectively.

Due to the above process, a layout of a specific hierarchy level, i.e. groups of layout components are analyzed. In a layout components analyzed according to the above stated process, an arrangement of document description elements belonging thereto is referred so as to further analyze a layout by grouping the document description elements juxtaposed in a direction orthogonal to the direction which was used for the preceding grouping process, and repeating a process of replacing a previously analyzed layout components for a predetermined number of times. Also, if a document description element analyzed as a layout component is the only one child for a parent document description element, the analyzed document description element may be replaced with the parent document description element.

In analyzing a layout of a subsequent hierarchy level, each of layout components that were analyzed previously is reprocessed. To be more specific, referring to the arrangement of document description elements belonging to layout components analyzed previously, the document description elements juxtaposed in a determined direction are grouped. And the arrangement of document description elements under the grouped document description elements are referred, so as to analyze a layout by repeating the process of grouping the document description elements juxtaposed in a direction orthogonal to the direction which was used for the preceding grouping process for a predetermined number of times. As a direction used for an initial grouping process in the layout analysis of this subsequent hierarchy level, a direction orthogonal to the direction used for the final grouping process in the upper level layout analysis may be used. If the process of analyzing the subsequent hierarchy level is repeated, a layout analysis of an arbitrary hierarchy level can be realized within a possible range. In the above process, only the arrangement of partially specified document description elements may be referred as document description elements. Due to the above process, the layout, i.e. the layout component and the hierarchical relationship thereof are analyzed.

Figure 2:
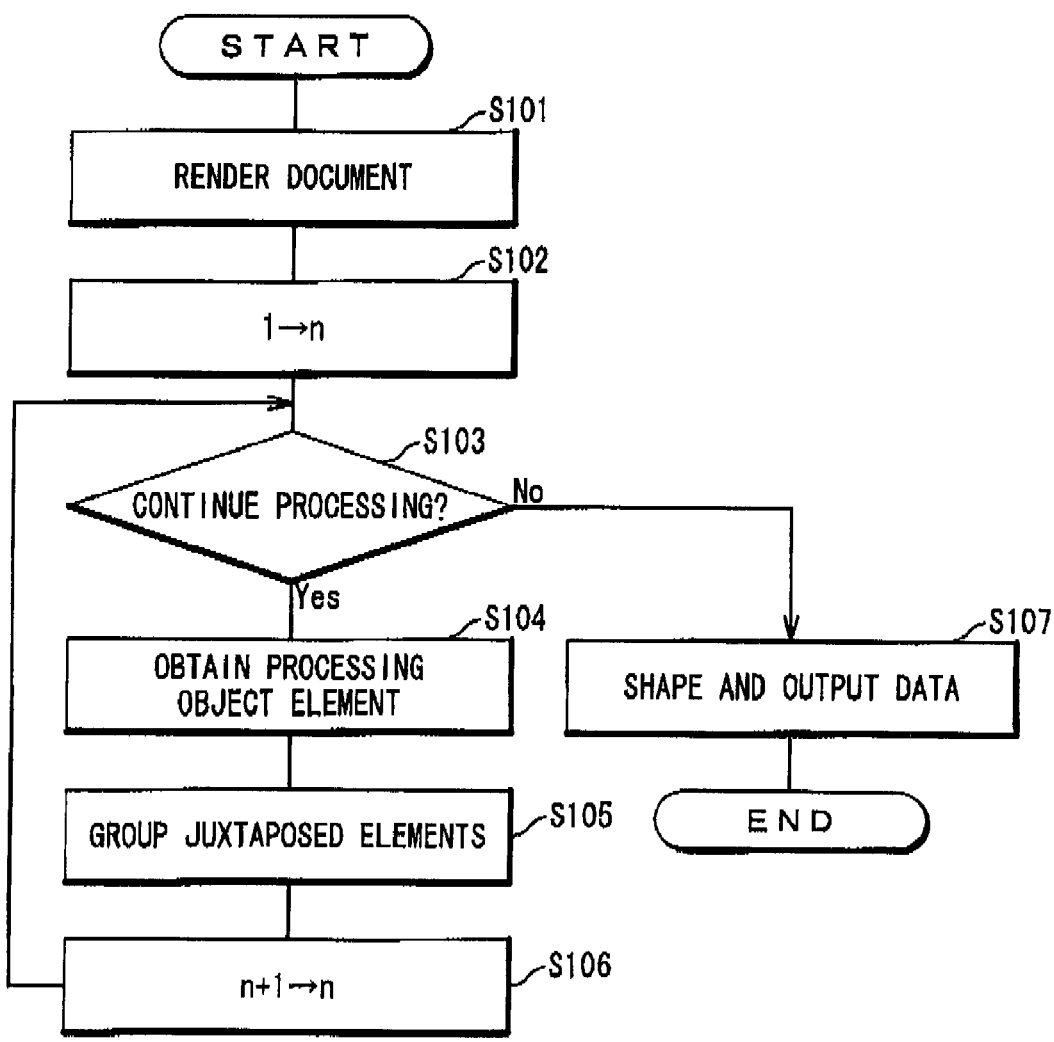
FIG. 2 is a flowchart showing an operation of an embodiment to realize the first invention of the present invention.

Explained next will be details of an operation in the present embodiment referring to FIGS. 1 and 2. The input unit 11 obtains the structured/semi-structured document from the outside, renders the document, and the rendering result is stored in the rendering result storage unit 21 (step S101).

The basic layout analysis unit 14 obtains the rendering result from the rendering result storage unit 21 and a processing object hierarchy level n is made to be 1 (step S102), and it is determined whether or not to continue the process in the processing object hierarchy level (step S103). For determination criteria, the upper limit value of the processing hierarchy levels or the size of the analyzed basic layout can be used. If it is determined that the process is not continued, the basic layout analysis unit 14 advances to step S107.

If it is determined that the process is continued in step S103, the basic layout analysis unit 14 obtains a document description element which is to be processed (step S104).

The basic layout analysis unit 14 refers to the arrangement of document description elements which is to be processed, analyzes the layout by grouping the document description elements juxtaposed in a determined direction, and relates the document description elements to layout components of an upper hierarchy level so as to store in the analysis result string unit 22 (step S105).

The basic layout analysis unit 14 sets the processing object hierarchy level n to be n+1 (step S106), and repeats step S103 and subsequent processes thereof.

The output unit 13 obtains information of layout components and the hierarchical relationship thereof from the analysis result storage unit 22, and shapes the layout components into a format expressed by using reference of the document description elements in order to output externally (step S107).

In the present embodiment, an arrangement of document description elements of the structured/semi-structured document is referred so as to group the juxtaposed document description elements for a layout analysis, so that it is possible to analyze the layout based on the arrangement of the document description elements. Therefore, even in the structured/semi-structured document with various description methods, the layout intended by a document provider can be analyzed. Moreover, the layout is outputted in a format expressed by using reference of the document description elements, so that application can be developed by third person utilizing layout information.

Figure 11:
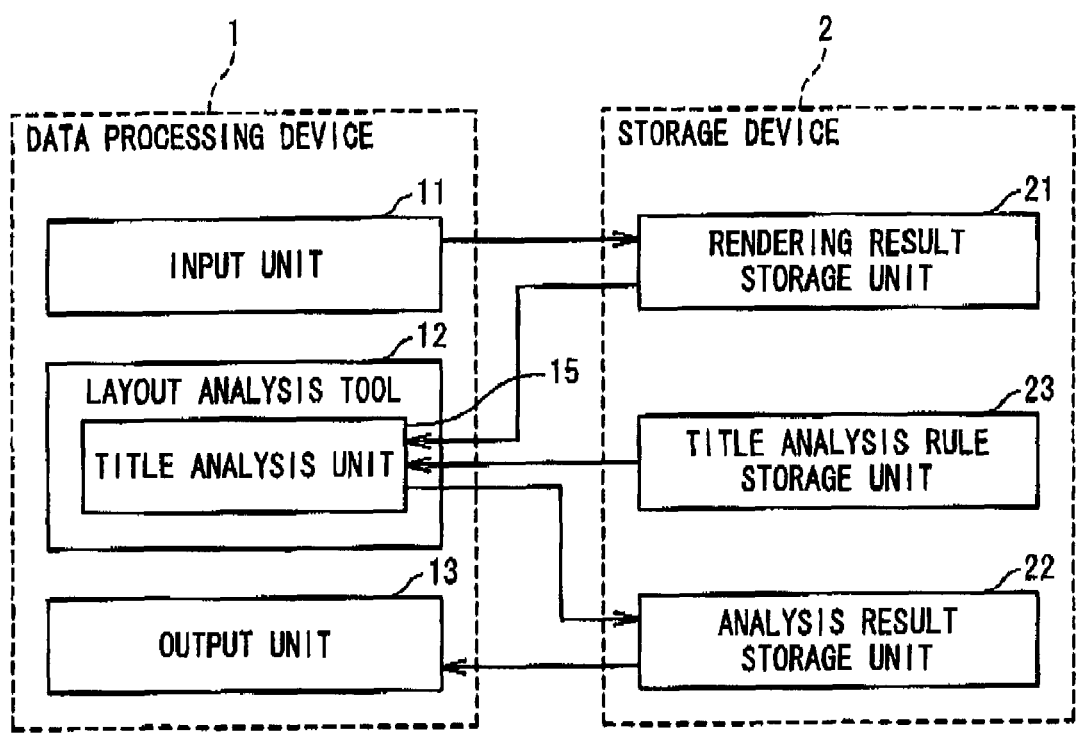
FIG. 11 is a block diagram showing the configuration of an embodiment to realize the second invention of the present invention.

Explained next will be details of the second embodiment of the present invention referring to the drawings. Referring to FIG. 11, the second embodiment of the present invention includes a data processing device 1 operated by program control, and a storage device 2 for storing information.

The data processing device 1 is provided with an input unit 11, a layout analysis tool 12, and an output unit 13. The storage device 2 is provided with a rendering result storage unit 21, an analysis result storage unit 22, and a title analysis rule storage unit 23.

The input unit 11 obtains a structured/semi-structured document from the outside, renders the document, and stores the rendering result in the rendering result storage unit 21. The layout analysis tool 12 has a title analysis unit 15. The output unit 13 obtains a group of titles from the analysis result storage unit 22, and shapes the titles into a format expressed by using reference of the document description elements in order to output externally.

The rendering result storage unit 21 stores the processing results of the input unit 11 and the analysis result storage unit 22 stores the processing results of the layout analysis tool 12, respectively. The title analysis rule storage unit 23 stores a title analysis rule in advance, i.e. a rule for title determination criteria on the basis of the name, property, style, and content values of the document description elements.

The title analysis unit 15 obtains the rendering result from the rendering result storage unit 21, and the title analysis rule from the title analysis rule storage unit 23, so as to analyze the title by comparing the name, property, style and contents of the document description element with the title analysis rule. To be more specific, a specified document description element such as, for example, a document description element which is the root is made to be a processing object element, and the processing object element is compared with the title analysis rule in the name, property, style and content of the document description element. If the document description element is determined to be a title by the comparison result, the document description element is stored as the title in the analysis result storage unit 22, and the process is continued for any unprocessed processing object elements.

If it is determined that the document description element is not a title, a child document description elements of that document description element is newly made to be the object elements to be processed, and the process is continued until no more unprocessed processing object element exists. As the title analysis rule here, it is possible to use a rule based on the specific property of the document description element on the rendering image such as a property which is unique within a document, usage of a background color or background image, and usage of a less frequently used character color and character size within a document. In the above process, a group of a plurality of document description elements grouped by having a same name, same property or a same style may be used as the document description element. Due to the above process, a group of titles is analyzed and stored in the analysis result storage unit 22.

Referring to FIGS. 11 and 12, the details of the operation in the present embodiment is explained. The input unit 11 obtains a structured/semi-structured document from the outside, renders the document, and stores the rendering results in the rendering result storage unit 21 (step S201).

The title analysis unit 15 obtains a rendering result from the rendering result storage unit 21, and a title analysis rule from the title analysis rule storage unit 23 respectively, in order to obtain the document description element which is to be processed (step S202).

The title analysis unit 15 checks the existence of the document description element as the object to be processed, and advances to step S208 if it is determined that the document description element which is to be processed does not exist (step S203).

If it is determined that the document description element of the processing object exists in step S203, the title analysis unit 15 compares the name, property, style and content of the document description element with the title analysis rule (step S204).

If it is determined that the document description element is not a title by the comparison in step S204, or when the document description element is stored as a title in step S206, the title analysis unit 15 obtains a document description element which becomes the object in the subsequent process, performing step S203 and subsequent processes thereof for the document description element (step S205).

If it is determined that the document description element is a title by the comparison in step S204, the title analysis unit 15 stores the document description element as the title in the analysis result storage unit 22, and advances to step S205 (step S206).

The output unit 13 obtains a group of titles from the analysis result storage unit 22, and shapes the titles into a format expressed by using reference of the document description elements, in order to output externally (step S207).

Explained next will be the effects of the present embodiment. In the present embodiment, a title is analyzed by using the property, style and contents as well as the name of a document description element of the structured/semi-structured document, so that it is possible to analyze the title expressed by using the property and style. Therefore, the comprehensive title analysis can be realized. Moreover, since the title is outputted in a format expressed by using reference of the document description element, applications can be developed by a third person utilizing the title information.

Figure 16:
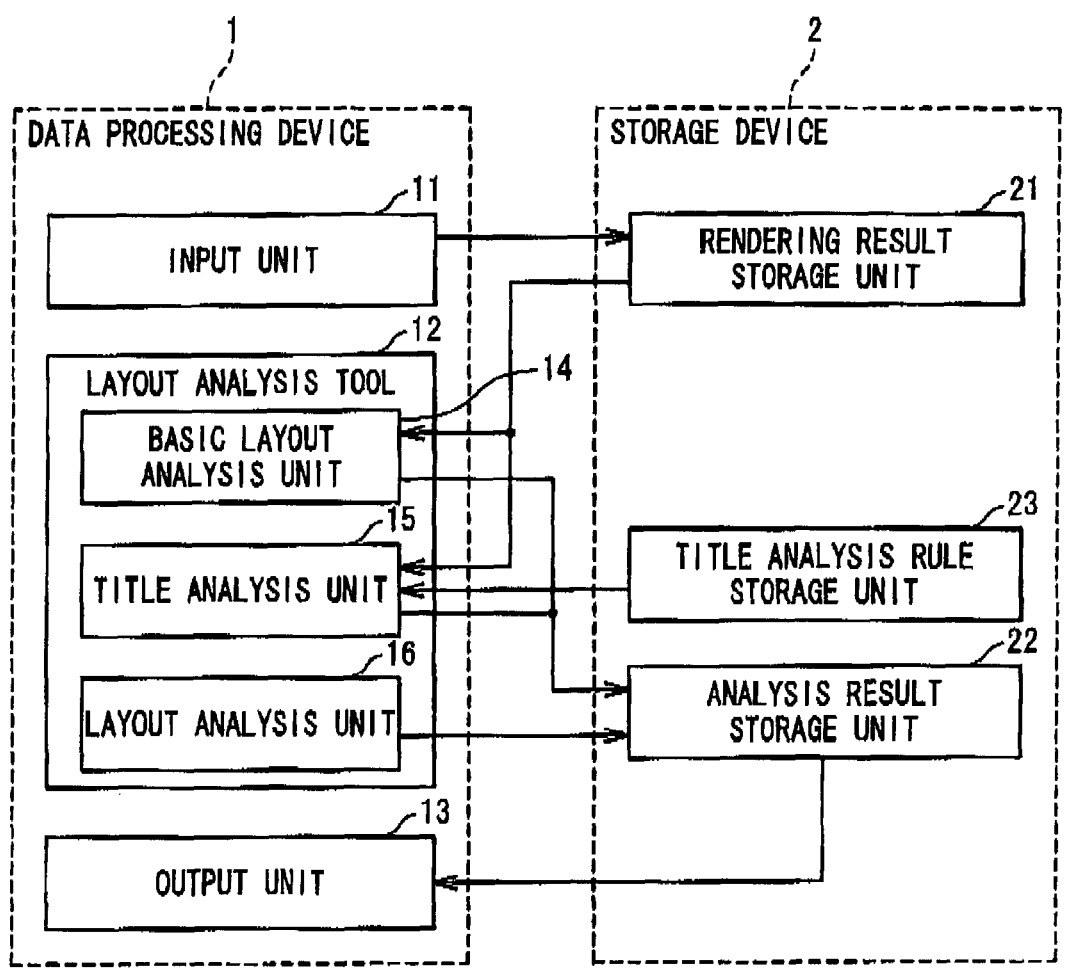
FIG. 16 is a block diagram showing the configuration of an embodiment to realize the third invention of the present invention.

Explained next will be details of the third embodiment of the present invention referring to the drawings. Referring to FIG. 16, the third embodiment of the present invention includes a data processing device 1 operated by a program control, and a storage device 2 for storing information.

The data processing device 1 is provided with an input unit 11, a layout analysis tool 12, and an output unit 13. The storage unit 2 is provided with a rendering result storage unit 21, an analysis result storage unit 22, and a title analysis rule storage unit 23.

The input unit 11 obtains a structured/semi-structured document from the outside, renders the document, and stores the rendering results in the rendering result storage unit 21.

The layout analysis tool 12 has a basic layout analysis unit 14, a title analysis unit 15, and a layout analysis unit 16.

The output unit 13 obtains new layout components, the hierarchical relationship thereof, and a corresponding relationship between each of the components and titles from the analysis result storage unit 22, shaping the new layout components and the titles into the format expressed by using reference of the document description elements, in order to output externally. IDs may be given to the new layout components to output.

The basic layout analysis unit 14 obtains the rendering result from the rendering result storage unit 21, and refers to the arrangement of the document description elements, so as to analyze the layout by grouping the document description elements juxtaposed in a determined direction. The basic layout analysis unit 14 has the same function with the basic layout analysis unit 14 indicated in the first embodiment of the present invention.

The title analysis unit 15 obtains the rendering result from the rendering result storage unit 21, and the title analysis rule from the title analysis rule storage unit 23, so as to analyze the title by comparing the name, property, style and content of the document description element with the title analysis rule. The title analysis unit 15 has the same function with the title analysis unit 15 indicated in the second embodiment of the present invention.

The layout analysis unit 16 obtains, from the analysis result storage unit 22, components of the layout analyzed in the basic layout analysis unit 14, the hierarchical relationship thereof, and the title analyzed in the title analysis unit 15, so as to generate a new layout by grouping a layout component having no title with a layout component having a title or another layout component having no title. To be more specific, layout component of a first hierarchy level are initially obtained, and the component and a title included in the component are linked. A component having no title is formed into a group with, for example, a component in the shortest distance in the direction toward the forefront on a source out of components having a title. If a component with the title does not exist in the shortest distance, a group is formed with, for example, a component having no the title in the shortest distance. The grouped layout components are stored in the analysis result storage unit 22 as a new layout component along with the title belonging to the components. Furthermore, the above process is repeated for a number of hierarchy levels of the layout analyzed in the basic layout analysis unit 14, so as to analyze new layout components, the hierarchical relationship thereof, and the corresponding relationship between each of the components and the title.

The rendering result storage unit 21 stores processing results of the input unit 11, and the analysis result storage unit 22 stores processing results of the layout analysis tool 12, respectively. The title analysis rule storage unit 23 stores a title analysis rule in advance.

Figure 17:
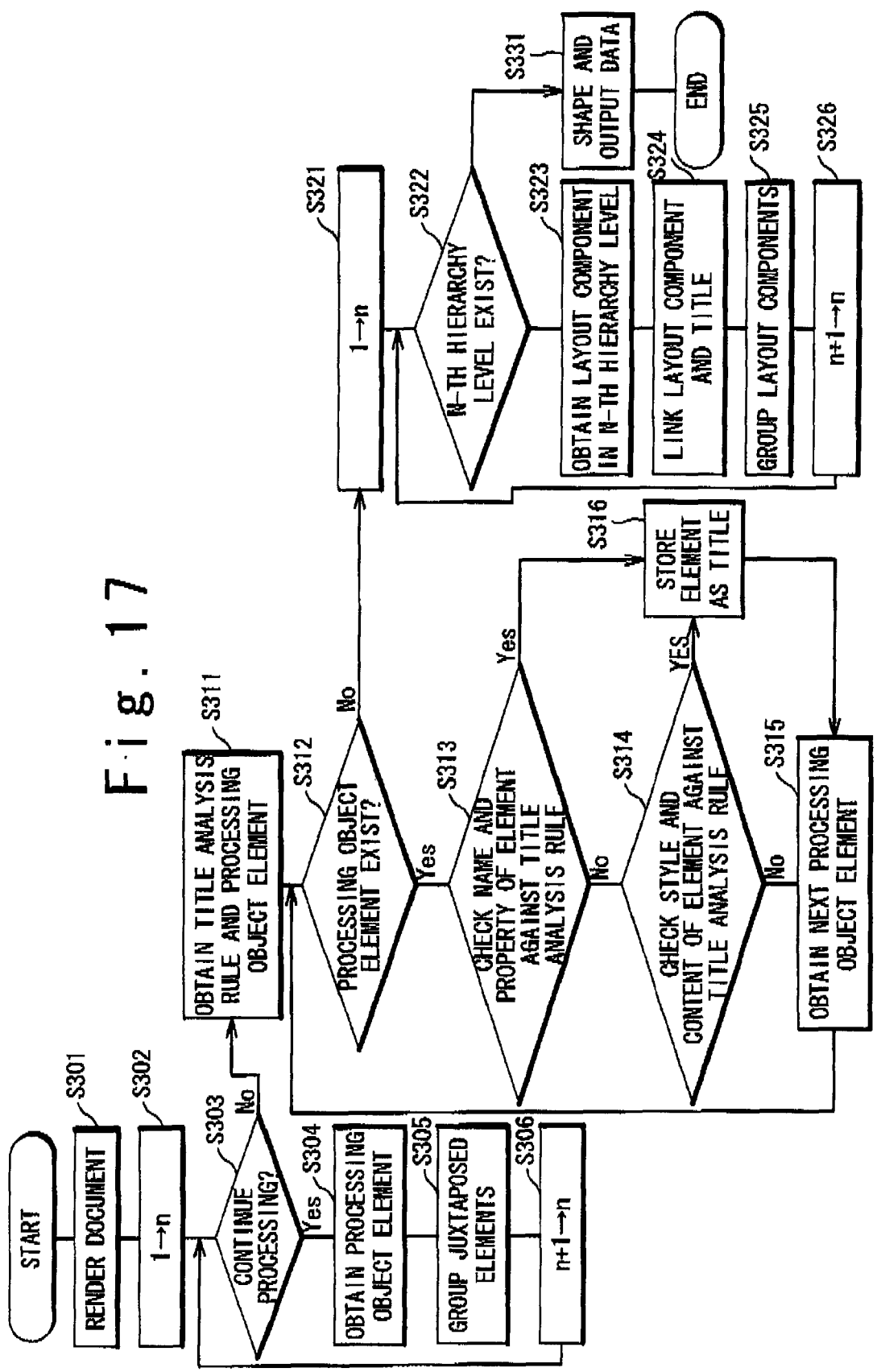
FIG. 17 is a flowchart showing an operation of an embodiment to realize the third invention of the present invention.

Explained next will be details of the operation in the present embodiment referring to FIGS. 16 and 17. The input unit 11 obtains a structured/semi-structured document from the outside, renders the document, and stores the rendering results in the rendering result storage unit 21 (step S301).

The operation of the basic layout analysis unit 14 is same to the operation of the basic layout analysis unit (14 in FIG. 1) indicated in the first embodiment of the present invention (steps S302 through S306).

The operation of the title analysis unit 15 is same to the operation of the title analysis unit (15 in FIG. 11) indicated in the second embodiment of the present invention (steps S311 through S316).

The layout analysis unit 16 obtains, from the analysis result storage unit 22, components of the layout analyzed in the basic layout analysis unit 14, the hierarchical relationship thereof, and the title analyzed in the title analysis unit 15, and set the processing object hierarchy level n to 1 (step S321).

The layout analysis unit 16 determines whether or not a layout component of the processing object hierarchy exists, and advances to step S331 if it is determined that a layout component of the processing object hierarchy level does not exist. (step S322).

If it is determined that a layout component of the processing object hierarchy level exists in step S322, the layout analysis unit 16 obtains a layout component of the n-th hierarchy (step S323) and the layout component of the n-th hierarchy and the title are linked (step S324).

The layout analysis unit 16 groups a layout component having no title and a layout component having a title or another layout component having no title so that a new layout component is analyzed and stored in the analysis result storage unit 22 (step S325).

The layout analysis unit 16 sets the processing object hierarchy level n to be n+1, and repeats step S322 and subsequent processes thereof (step S326).

The output unit 13 obtains new layout components, the hierarchical relationship thereof, and the corresponding relationship between each of the components and the title from the analysis result storage unit 22, shaping the new layout components and the title into a format expressed by using reference of the document description elements in order to output externally (step S331).

The execution sequence of the operations of the basic layout analysis unit 14 (steps S302 through S306) and that of the operations of the title analysis unit 15 (steps S311 through S316) can be exchanged. To be more specific, the step S311 through the step S316 can be executed immediately after the step S301, and the step S302 through the step S306 are executed when the step S312 is "No". Moreover, in this case, the process advances to step S321 when step S303 is "No".

Next, the effects of the present embodiment are explained. In the present embodiment, a layout which is analyzed by grouping juxtaposed document description elements referring to the arrangement of the document description elements, is used with the title analyzed by using the property, style and contents as well as the name of the document description elements, so as to form a layout component having no title into a group with a layout component having a title or another layout component having no title, thereby a new layout is generated by using a group of related components as a new component, which allows a layout analysis reflecting the logical structure more precisely. It is therefore possible to analyze the layout in which the intention of a document provider is more reflected. Moreover, since the layout and the title are outputted in the format expressed by using reference of the document description elements, applications can be developed by a third person by utilizing the layout information.

Figure 22:
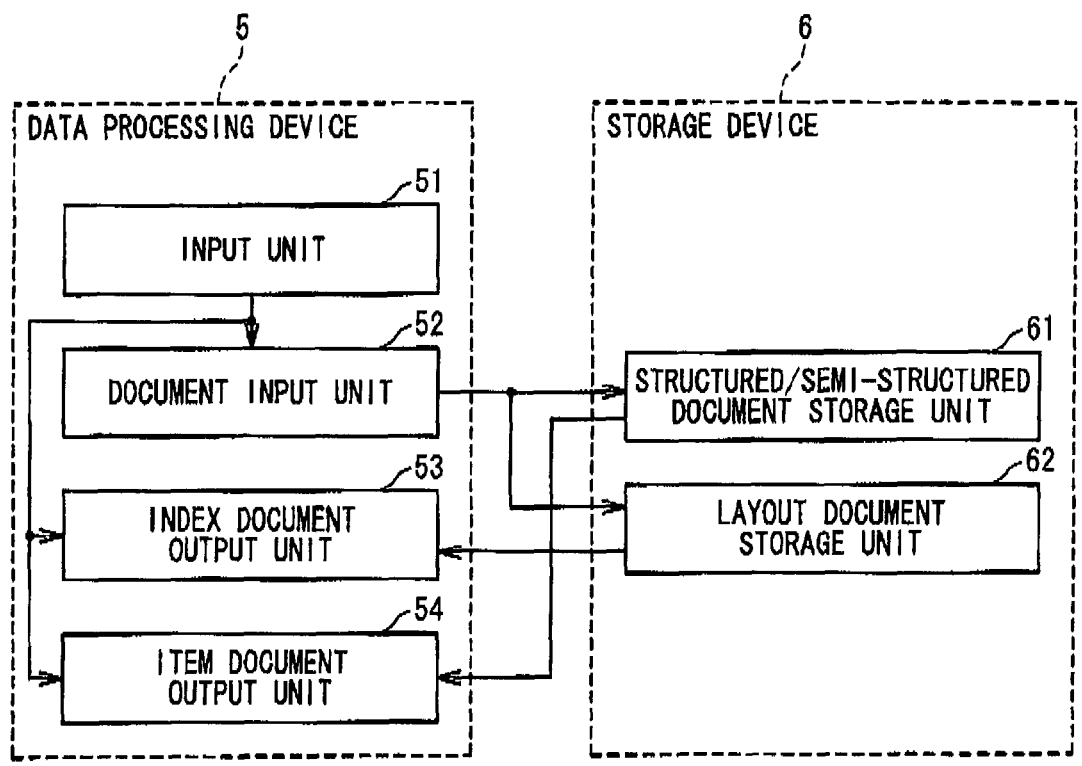
FIG. 22 is a block diagram showing the configuration of an embodiment to realize the fourth invention of the present invention.

Explained next will be details of a fourth embodiment of the present invention referring to the drawings. Referring to FIG. 22, the fourth embodiment of the present invention includes a data processing device 5 operated by a program control, and a storage device 6 for storing information.

The data processing device 5 is provided with an input unit 51, a document input unit 52, an index document output unit 53, and an item document output unit 54. The storage device 6 is provided with a structured/semi-structured document storage unit 61, and a layout document storage unit 62.

The input unit 51 obtains a user input from an input device such as a keyboard or through networks for obtaining the URI (universal resource identifier) of a structured/semi-structured document desired by the user. The input unit 51 also obtains the user input from the input device such as a keyboard or through networks and controls an output. To be more specific, in accordance with an obtained input, it is determined whether to output an index document or to output the document describing index item content. In the case of outputting the document describing index item content, an index item to output is also determined.

The document input unit 52 uses the URI of the structured/semi-structured document which was obtained in the input unit 51 and is desired by the user, so as to obtain the document and store the document in the structured/semi-structured document storage unit 61. The document input unit 52 also obtains the document which is specified by the obtained structured/semi-structured document and describes the layout information by using reference of the document description elements, and stores the document in the layout storage unit 62. The document input unit 52 may also obtain the document describing the layout information of the obtained structured/semi-structured document by using another method such as utilizing the header information of a communication protocol. Moreover, the layout information of the obtained structured/semi-structured document may be analyzed by using the system indicated in the third embodiment of the present invention, and stored in the layout document storage unit 62.

If it is determined that the input unit 51 outputs an index, the index document output unit 53 obtains the structured/semi-structured document desired by the user from the structured/semi-structured document storage unit 61, and a document which describes the layout information of the structured/semi-structured document from the layout document storage unit 62 respectively so as to generate an index document. To be more specific, all terminal components of the layout are extracted from the document describing layout information, and the title specified in each of the terminal components is extracted to pick out the document description elements corresponding to the title from the original structured/semi-structured document by using reference of the document description element, shaping and arranging the document description elements in order for generating the index document. Here, in the case of the components without a specified title, a fixed number of characters may be picked out and arranged from content under the level of the document description element corresponding to the component. Moreover, the index may be decorated by inserting a parting line between layout components of a specific hierarchy level, and inserting a title separately given to the structured/semi-structured document or the like. Furthermore, in one or more terminal components of a layout having the same upper hierarchy component, the upper hierarchy component may be used in place of the terminal components. A generated index document is presented to the user from an output device such as a display and a speaker or through networks.

It the input unit 51 determines to output the document which describes the content of the index item and determines the index item to be outputted, the item document output unit 54 obtains the structured/semi-structured document desired by the user from the structured/semi-structured document storage unit 61, and the document which describes the layout information of the structured/semi-structured document from the layout document storage unit 62 respectively, so as to generate the document which describes the content of the specified index item. To be more specific, a layout component which has a specified index item as the title is extracted, and the document description elements corresponding to the component are picked out from the original structured/semi-structured document by using reference of the document description element, shaping and arranging the document description elements in order, so as to generate the document which describes the content of the index item. For the item content, the content of the document description elements that were picked out may be further picked out and arranged. The document description elements of the structured/semi-structured document may also be replaced with other document description elements and arranged. Furthermore, as the document describing index content, the structured/semi-structured document itself desired by the user may also be used and outputted by adjusting a position to a region corresponding to the specified index item. The generated document which describes the content of the index item is presented to the user from the output device such as a display and a speaker or through networks.

The structured/semi-structured document storage unit 61 and the layout document storage unit 62 store processing results of the document input unit 52. The index document output unit 53 or the item document output unit 54 may also have a configuration here to select and output an index document corresponding to the user input or the document describing index item content, on condition that the index document output unit 53 stores the index document when the index document was generated, while the item document output unit 54 generates and stores all documents that describes the content of the index item in advance.

Figure 23:
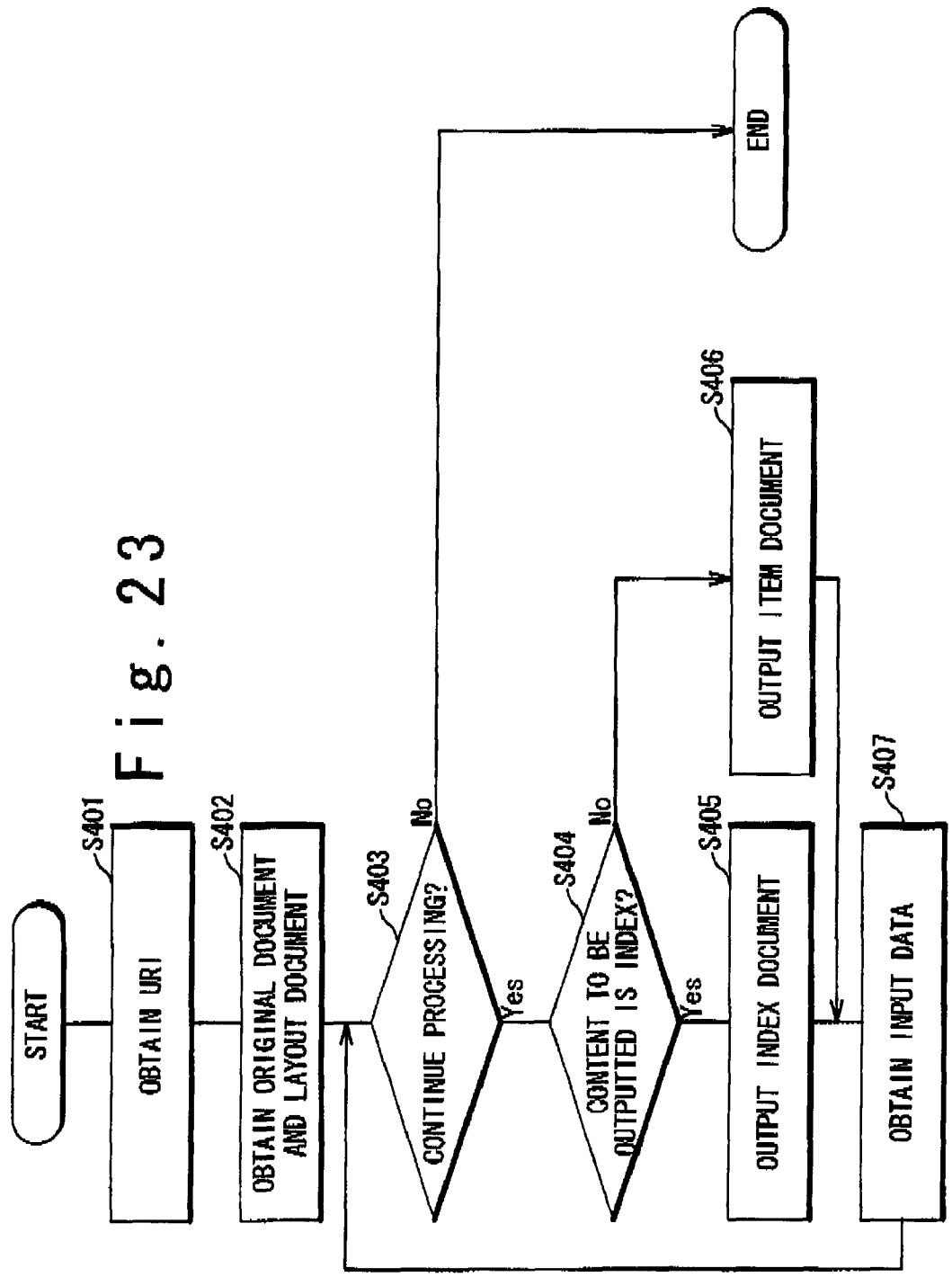
FIG. 23 is a flowchart showing an operation of the embodiment to realize the fourth invention of the present invention.

Explained next will be details of an operation in the present embodiment referring to FIGS. 22 and 23. The input unit 51 obtains the user input from the input device such as a keyboard or through networks, and obtains the URI of the structured/semi-structured document desired by the user (step S401).

The document input unit 52 obtains a document by using the obtained URI, and stores the document in the structured/semi-structured document storage unit 61. The document input unit 52 also obtains a document which describes the layout information specified by the obtained structured/semi-structured document, and stores the document in the layout document storage unit 62 (step S402).

The input unit 51 determines whether or not to continue the process, and if it is determined to discontinue the process, the process is finished (step S403).

If it is determined to continue the process in step S403, the input unit 51 determines whether the content to be outputted is an index or not (step S404).

If it is determined to output the index in step S404, the index document output unit 53 obtains the structured/semi-structured document desired by the user from the structured/semi-structured document storage unit 61, and the document which describes the layout information of the structured/semi-structured document from the layout document storage unit 62 respectively, so as to generate the index document. A generated index document is presented to the user from the output device such as a display and a speaker, or through networks (step S405).

If it is determined that the index is not outputted in step S404, the item document output unit 54 further determines the item in the index item to be outputted, obtaining the structured/semi-structured document desired by the user from the structured/semi-structured document storage unit 61, and the document describing layout information of the structured/semi-structured document from the layout document storage unit 62, so as to generate the document which describes the content of the specified index item. The generated document which describes the content of the index item is presented to the user from the output device such as a display and a speaker or through networks (step S406).

After outputting the index document in step S405, or after outputting the document which describes the content of the index item in step S406, the input unit 51 obtains the user input from the input device such as a keyboard or through networks, and repeats step S403 and subsequent processes thereof (step S407).

Explained next will be the effects of the present embodiment. In the present embodiment, a structured/semi-structured document and the document which describes layout information of the structured/semi-structured document are used to generate and output an index document and the document which describes the content of the index item, so that it is made possible to browse a document using the index which precisely captures a logical structure of a document intended by the document provider, resulting in easier understanding of entire images of a document even in the terminal with a small screen, and allowing document browsing by a small number of operations. Therefore, a document adapted to the environment of terminals can be presented.

Figure 27:
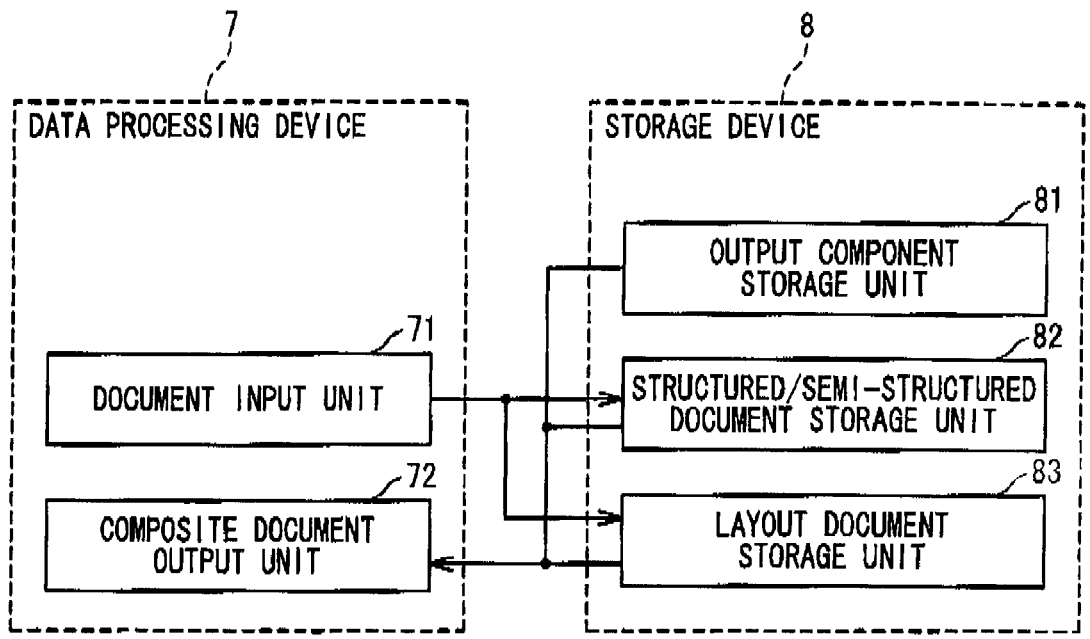
FIG. 27 is a block diagram showing the configuration of an embodiment to realize the fifth invention of the present invention.

Explained next will be details of the fifth embodiment of the present invention referring to the drawings. Referring to FIG. 27, the fifth embodiment of the present invention includes a data processing device 7 operated by a program control, and a storage device 8 for storing information.

The data processing device 7 is provided with a document input unit 71 and a composite document output unit 72. The storage device 8 is provided with an output component storage unit 81, a structured/semi-structured document storage unit 82, and a layout document storage unit 83.

The document input unit 71 obtains information related to an output component from the output component storage unit 81, and obtains documents corresponding to the URI described in the information, so as to store the information and the documents in the structured/semi-structured document storage unit 82. The document input unit 71 also obtains a document which is specified by each of the obtained structured/semi-structured documents and describes the layout information by using reference of the document description elements, and stores the document in the layout document storage unit 83. Here, the document input unit 71 may obtain the document describing layout information of the obtained structured/semi-structured document using another method such as utilizing the header information of a communication protocol. In the obtained structured/semi-structured document, the layout information may be analyzed by using the system indicated in the third embodiment of the present invention, and stored in the layout document storage unit 83.

The composite document output unit 72 obtains information related to an output component from the output component storage unit 81, a structured/semi-structured document desired by the user from the structured/semi-structured document storage unit 82, and a document describing layout information from the layout document storage unit 83 respectively, so as to generate the composite document. To be more specific, all combinations between the URIs and component IDs are obtained from information related to the output components, a component corresponding to the component ID from a document which corresponds to each of the URIs is extracted, and document description elements corresponding to the component from the original structured/semi-structured document by using reference of the document description elements are picked out, so that the document description elements are shaped and arranged in order for generating a composite document. In each of the components here, a content of document description elements belonging thereto may be further picked out and arranged. A generated composite document is presented to the user from the output device such as a display and a speaker or through networks.

When text information which expresses a component title is further stored as information related to an output component, and a component corresponding to an ID of a component to output is extracted in the composite document output unit 72, a title of the extracted component may be compared to the text information expressing the component title stored in the information related to the output component, searching the correct component by using the text information and renewing the ID of the component to output which is stored in the information related to the output component in the case of having a difference in the comparison, so as to allow generation of an appropriate composite document even if the layout is modified. Moreover, as the information related to the output component, information of a display position may be further stored and used to shape a composite document in the composite document output unit 72 by using information of the displayed position.

The output component storage unit 81 stores information related to the component to output, i.e. the information related to the group of combinations between the URI of the structured/semi-structured document to output and the ID of the component to output in the document. The structured/semi-structured document storage unit 82 and the layout document storage unit 83 store processing results of the document input unit 71.

Figure 28:
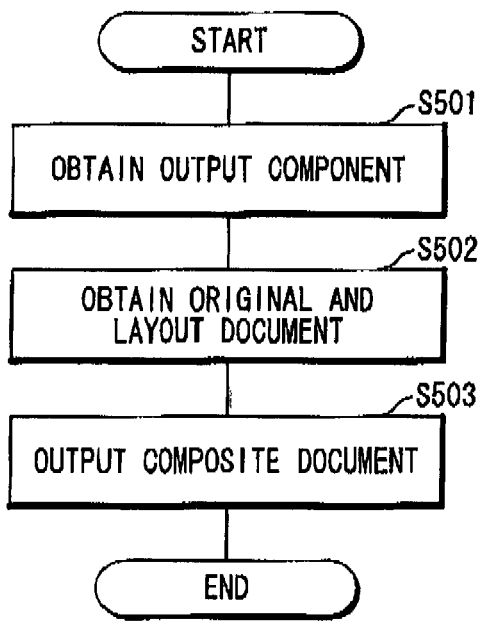
FIG. 28 is a flowchart showing an operation of an embodiment to realize the fifth invention of the present invention.

Explained next will be details of an operation in the present embodiment referring to FIGS. 27 and 28. The document input unit 71 obtains information related to an output component from the output component storage unit 81 (step S501).

The document input unit 71 obtains documents corresponding to the URI described in the obtained information related to the output component, and stores the URI in the structured/semi-structured document storage unit 82. The document input unit 71 also obtains the document which is specified in each of the obtained structured/semi-structured documents and describes layout information, and stores the document in the layout document storage unit 83 (step S502).

The composite document output unit 72 obtains information related to an output component from the output component storage unit 81, the structured/semi-structured document desired by the user from the structured/semi-structured document storage unit 82, and the document which describes the layout information of the structured/semi-structured document from the layout document storage unit 83, so as to generate the composite document. The generated composite document is presented to the user from the output device such as a display and a speaker or through networks (step S503).

Explained next will be the effects of the present embodiment. In the present embodiment, information related to the output component, the structured/semi-structured document, and the document which describes layout information of the structured/semi-structured document are used to generate and output a composite document which is composed of specified layout components exclusively, so that it is made possible to selectively browse necessary parts of a document using the composite document which precisely captures the logical structure of the document intended by the document provider, allowing comfortable document browsing in a terminal with a small network bandwidth and the terminal with a small screen. It is also possible to browse a document in accordance with the preference of each user. Therefore, a document adapted to respective networks, terminals, and user environments can be provided.

Figure 32:
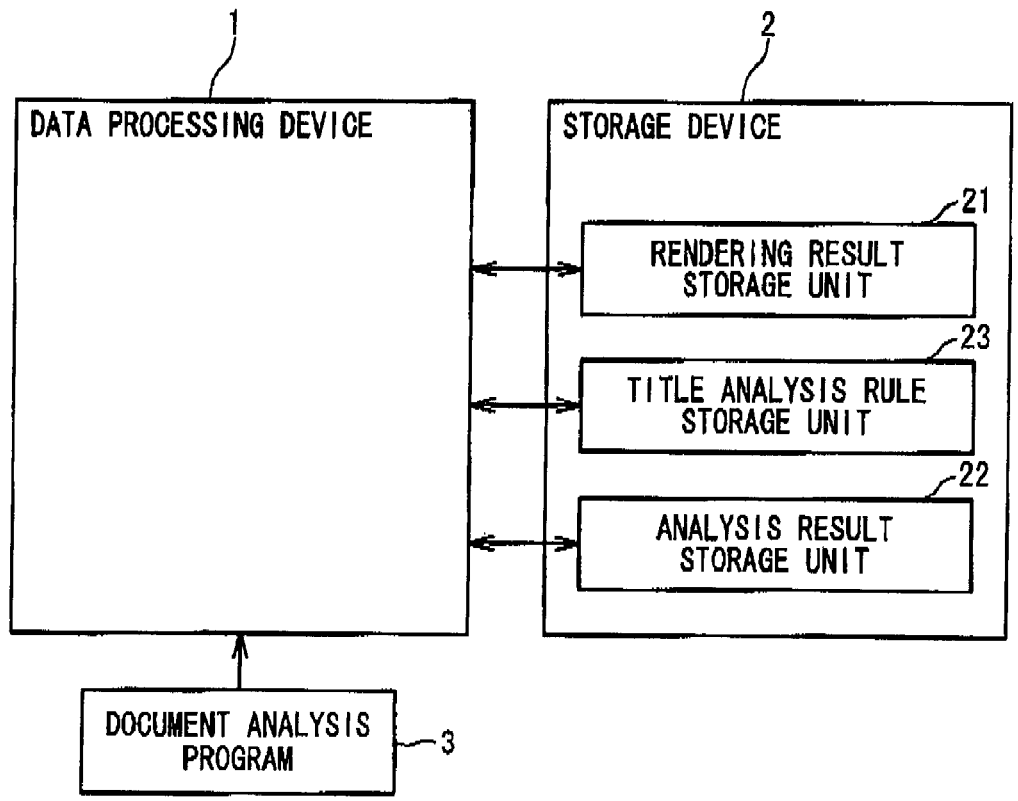
FIG. 32 is a block diagram showing the configuration of the sixth embodiment of the present invention.

Explained next will be details of a sixth embodiment of the present invention referring to the drawings. With reference to FIG. 32, the sixth embodiment of the present invention is provided with a data processing device 1 and a storage device 2 in the same manner with the first, second and third embodiments of the present invention.

A document analysis program 3 is read by the data processing device 1 to control the operation of the data processing device 1, generating the rendering result storage unit 21, the analysis result storage unit 22, and the title analysis rule storage unit 23 in the storage device 2. The data processing device 1 executes the same process with the data processing device 1 in the first, second and third embodiments by the control of the document analysis program 3.

Figure 33:
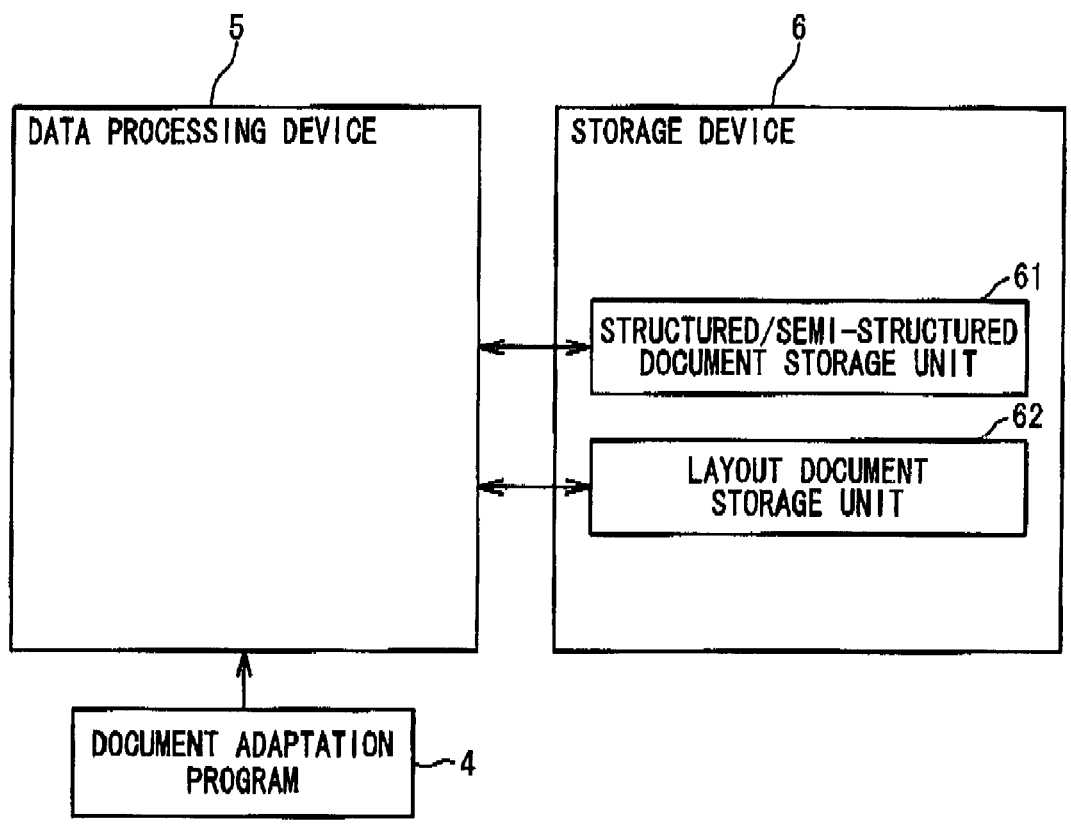
FIG. 33 is a block diagram showing the configuration of the seventh embodiment of the present invention.

Explained next will be details of a seventh embodiment of the present invention referring to the drawing. With reference to FIG. 33, the seventh embodiment of the present invention includes a data processing device 5 and a storage device 6 in the same manner with the fourth embodiment of the present invention.

The document adaptation program 4 is read by the data processing device 5 to control the operation of the data processing device 5, generating the structured/semi-structured document storage unit 61 and the layout document storage unit 62 in the storage device 6. The data processing device 5 executes the same process with the data processing device 5 in the fourth embodiment by the control of the program application program 4.

Figure 34:
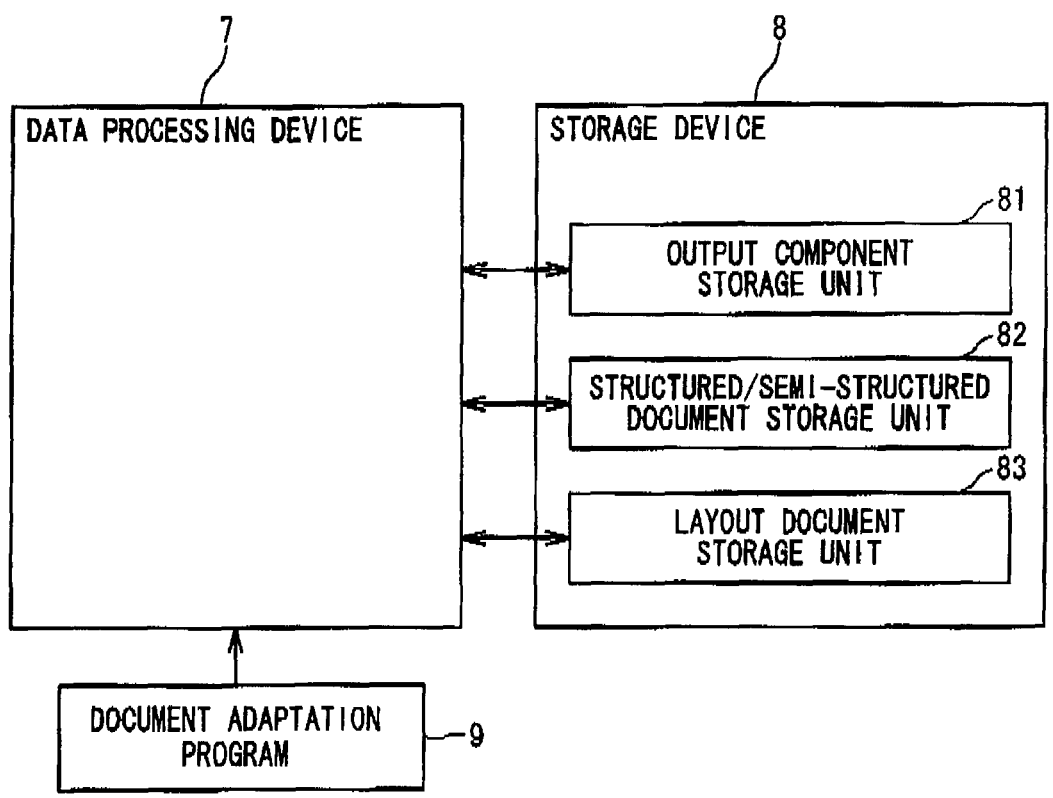
FIG. 34 is a block diagram showing the configuration of the eighth embodiment of the present invention.

Explained next will be details of the eighth embodiment of the present invention referring to the drawing. With reference to FIG. 34, the eighth embodiment of the present invention is provided with a data processing device 7 and a storage device 8 in the same manner with the fifth embodiment of the present invention.

A document adaptation program 9 is read by the data processing device 7 to control the operation of the data processing device 7, generating the output component storage unit 81, the structured/semi-structured document storage unit 82 and the layout document storage unit 83 in the storage device 8. The data processing device 7 executes the same process with the data processing device 7 in the fifth embodiment by the control of the document adaptation program 9.

Figure 35:
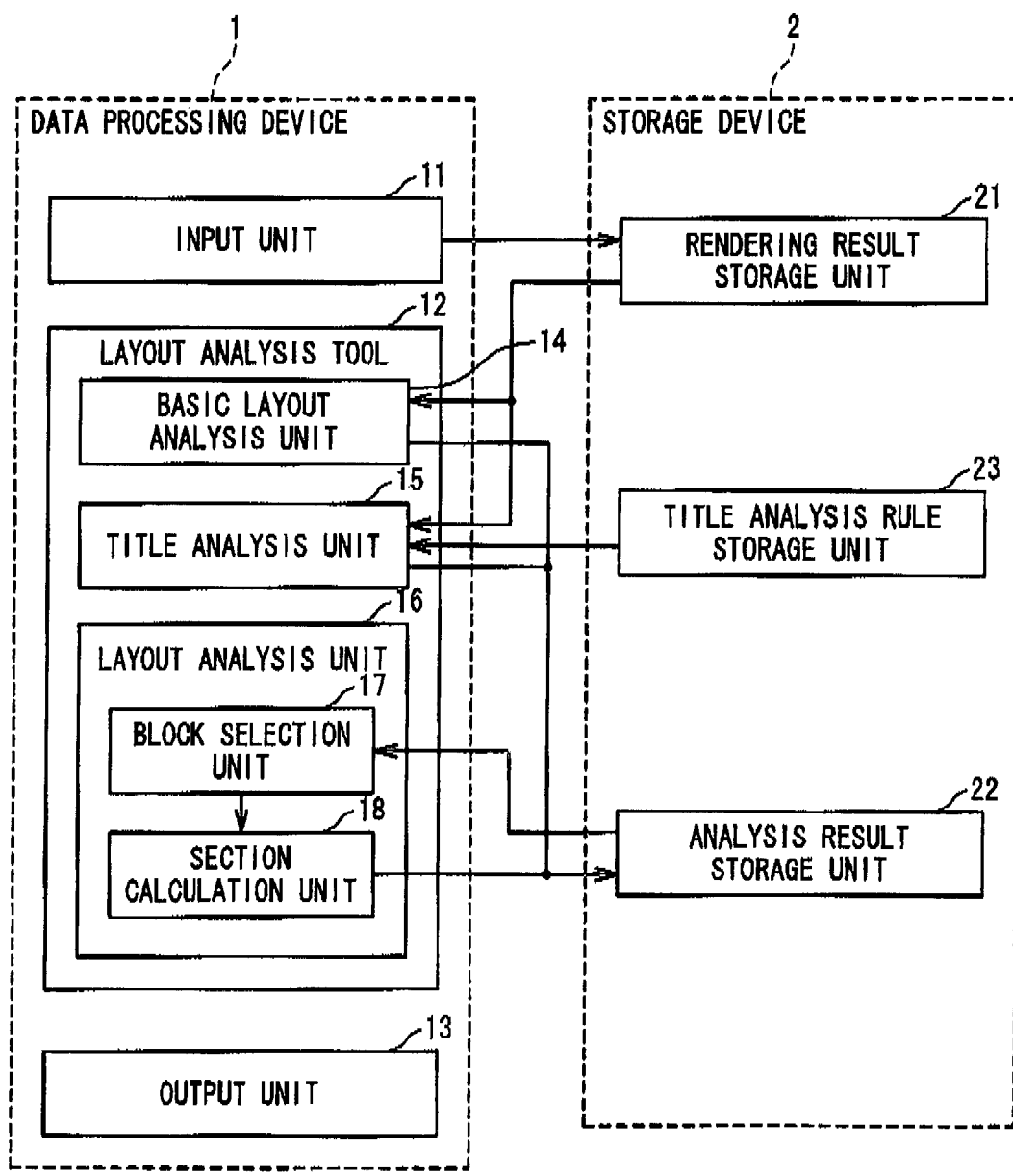
FIG. 35 is a block diagram showing the configuration of the ninth embodiment of the present invention.

Explained next will be details of the ninth embodiment of the present invention referring to the drawings. With reference to FIG. 35, the ninth embodiment of the present invention includes the data processing device 1 operated by a program control, and a storage device 2 for storing information.

The data processing device 1 is provided with the input unit 11, the layout analysis tool 12, and the output unit 13. The storage device 2 is provided with the rendering result storage unit 21, the analysis result storage unit 22, and the title analysis rule storage unit 23.

The input unit 11 obtains a structured/semi-structured document from the outside, renders the document, and stores the rendering results in the rendering result storage unit 21.

The layout analysis tool 12 has the basic layout analysis unit 14, the title analysis unit 15, and the layout analysis unit 16.

The output unit 13 obtains layout components, a hierarchical relationship thereof, and a corresponding relationship between each of the components and a title from the analysis result storage unit 22, shaping the layout components and the title into a format expressed by using reference of the document description elements for outputting.

The basic layout analysis unit 14 obtains the rendering results from the rendering result storage unit 21, and refers to the arrangement of document description elements, so as to analyze the layout by grouping the document description elements juxtaposed in a determined direction. The basic layout analysis unit 14 has the same function with the basic layout analysis unit 14 indicated in the first embodiment of the present invention.

The title analysis unit 15 obtains the rendering results from the rendering result storage unit 21, and the title analysis rule from the title analysis rule storage unit 23, so as to analyze the title by comparing the property, style and content as well as the name of the document description element with the title analysis rule. The title analysis unit 15 has the same function with the title analysis unit 15 indicated in the second embodiment of the present invention.

The layout analysis unit 16 has the block selection unit 17 and the section calculation unit 18.

The block selection unit 17 obtains, from the analysis result storage unit 22, the components of the first layout analyzed by the basic layout analysis unit 14 and the hierarchical relationship thereof, as well as the components of the second layout analyzed by the layout analysis unit 16 and the hierarchical relationship thereof, so as to select one separable second layout component composed of the first layout component that are made to be an analysis object. Furthermore, titles analyzed by the title analysis unit 15 are obtained, in which the titles are made to correspond to first layout components of the analysis object, and a main title is selected among the titles corresponding to the first layout components on the basis of the name, property and style of document components to compose the title which was made to correspond. Moreover, the component with the main title is made to be a main component. Here, the name, property, style and content of document description elements to compose the first layout component being the analysis object may be used as the basis of determining whether or not the component is a boundary line, so as to set the component determined as a boundary line as a main layout component, or a distance between the first layout components being the analysis object may be used as the basis of determining that a component with a distance equal to or larger than a predetermined distance from the immediately preceding component or the like is a main component.

The section calculation unit 18 forms a non-main component of the first layout components selected in the block selection unit 17 into a group with a main component or another non-main component, so as to generate a second layout component which is stored in the analysis result storage unit 22. To be more specific, a non-main component is formed into a group with, for example, a component in the shortest distance toward the forefront of a source among main components. If a main component does not exist in the shortest distance, the non-main component is formed into a group with, for example, a non-main component in the shortest distance. Here, a newly generated second layout component may be replaced with the original second layout component and stored, or the newly generated second layout component may be stored as a child of the original second layout component. Alternatively, components may be stored as the second layout component excluding a first layout component determined as a boundary line.

Figure 36:
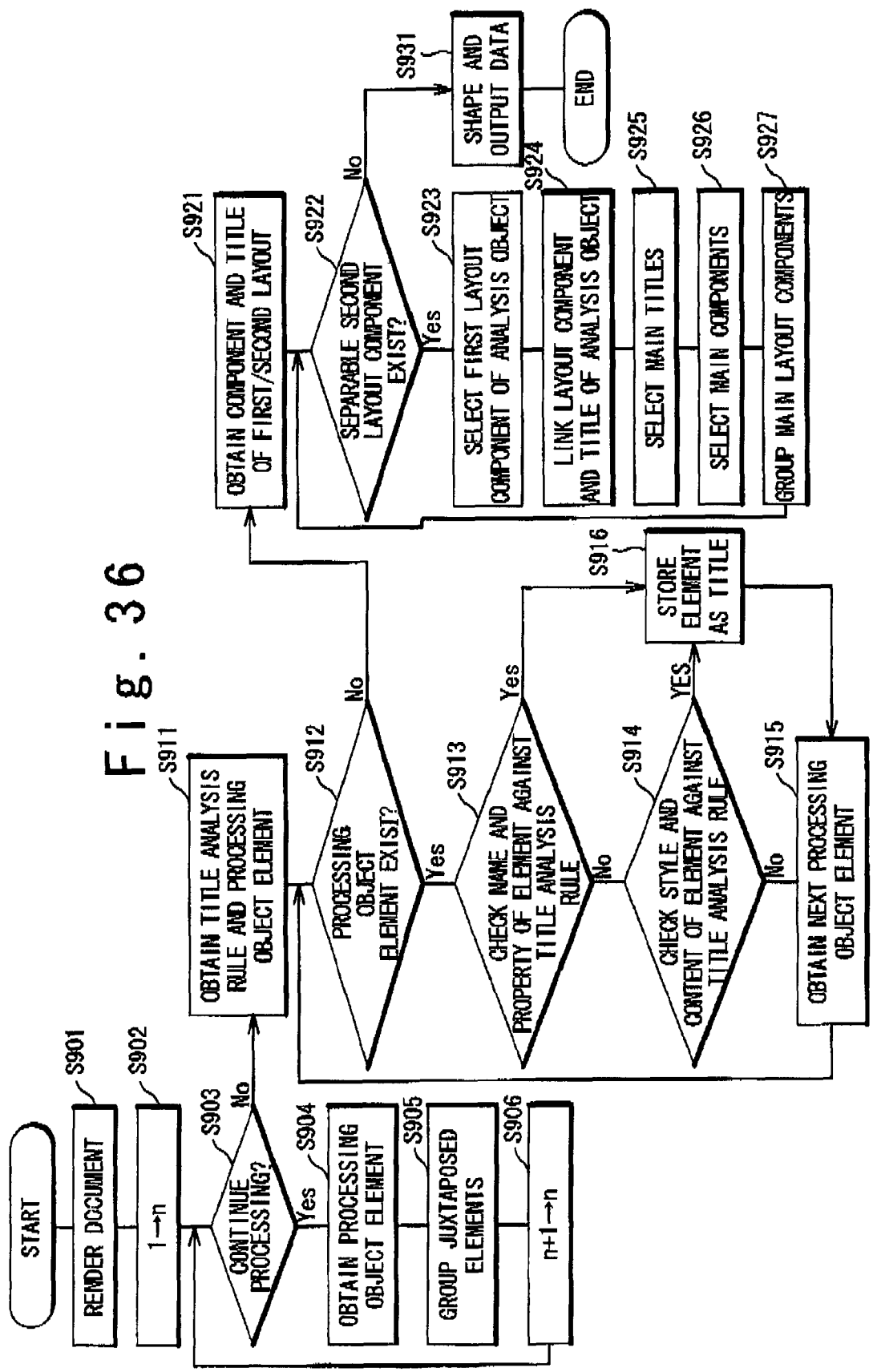
FIG. 36 is a flowchart showing an operation of the ninth embodiment of the present invention.

Explained next will be details of an operation in the present embodiment referring to FIGS. 35 and 36. The input unit 11 obtains a structured/semi-structured document from the outside, renders the document, and stores the rendering results in the rendering result storage unit 21 (step S901).

The operation of the basic layout analysis unit 14 is same to the operation of the basic layout analysis unit (14 in FIG. 1) indicated in the first embodiment of the present invention (steps S902 through S906)

The operation of the title analysis unit 15 is same to the operation of the title analysis unit (15 in FIG. 1) indicated in the second embodiment of the present invention (steps S911 through S916).

The block selection unit 17 obtains, from the analysis result storage unit 22, components of the first layout analyzed in the basic layout analysis unit 14, the hierarchical relationship thereof, the title analyzed in the title analysis unit 15, components of the second layout analyzed in the layout analysis unit F16, and the hierarchical relationship thereof (step S921).

The block selection unit 17 determines whether or not a separable second layout component exists, and advances to step S931 if it is determined that the separable second layout component does not exist (step S922). Determination criteria that can be used here include the number of titles included in the second layout component, the number of the first layout components with a title out of the first layout components to compose the second layout component, and an area, width and height of the second layout component, or the like.

If it is determined that the separable second layout component exists in step S923, the block selection unit 17 selects one separable second layout component composed of the first layout components that are made to be an analysis object (step S923).

In the block selection unit 17, the first layout component being the analysis object are made to correspond to titles (step S924), and a main title is selected on the basis of the name, property and style of document description elements to compose the titles that were made to correspond to the first layout components (step S925).

In the block selection unit 17, the first layout components with the main title selected in step S925 are made to be main components. Here, it may be determined whether or not the first layout component being the analysis object is a boundary line on the basis of the name, property, style and content of the document description elements to compose the first layer component, so as to set the component determined as the boundary line and even a subsequent component thereof as the main layout component, or a distance between the first layout components being the analysis object may be used as the basis of determining that a component with the distance equal to or larger than the predetermined distance from the immediately preceding component thereof is the main component (step S926).

In the section calculation unit 18, a second layout component is generated by forming a non-main component of the first layout component selected in the block selection unit 17 into a group with a main component or another non-main component, and stored in the analysis result storage unit 22 (step S927).

The output unit 13 obtains second layout components, the hierarchical relationship thereof, and the corresponding relationship between each of the components and a title from the analysis result storage unit 22, shaping the second layout components and the title into a format expressed by using reference of the document description elements for outputting (step S931).

The execution sequence between the operations of the basic layout analysis unit 14 (steps S902 through S906) and the operations of the title analysis unit (steps S911 through S916) can be exchanged.

Explained next will be the effects of the present embodiment. In the present embodiment, the first layout components are formed into a group to generate a new second layout component on the basis of a main title selected by the name, property and style of document description elements to compose a title or the likes so that it is possible to analyze a layout in which the logical structure is further captured. It is therefore possible to analyze a layout reflecting the intention of the document provider. Moreover, a layout and title are outputted in a format expressed by using reference of the document description elements, so that the third person can develop applications by utilizing the layout information.

IMPLEMENTATION EXAMPLE

Explained next will be the first implementation example of the present invention referring to drawings. This implementation example corresponds to the first embodiment of the present invention. The present implementation example is provided with a personal computer as a data processing device and a data storage device.

The personal computer has a central processing unit which functions as an input unit, a layout analysis unit, an output unit and a basic layout analysis unit, and a memory device, magnetic disc storage device which function as a rendering result storage unit and an analysis result storage unit.

Figure 3:
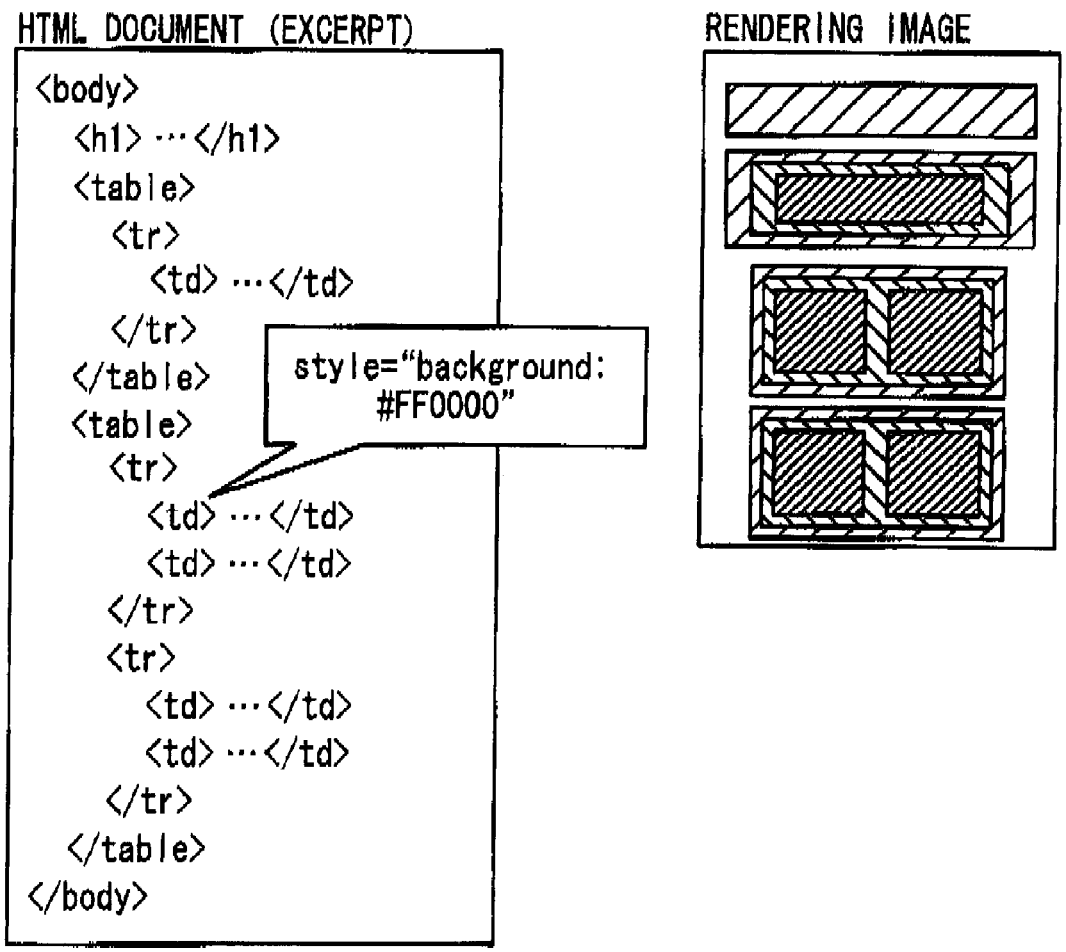
FIG. 3 is a diagram showing an example of an HTML document.

Explanation made here about a layout analysis up to the second hierarchy level will be targeted for an HTML document shown in FIG. 3 as the structured/semi-structured document.

Figure 4:
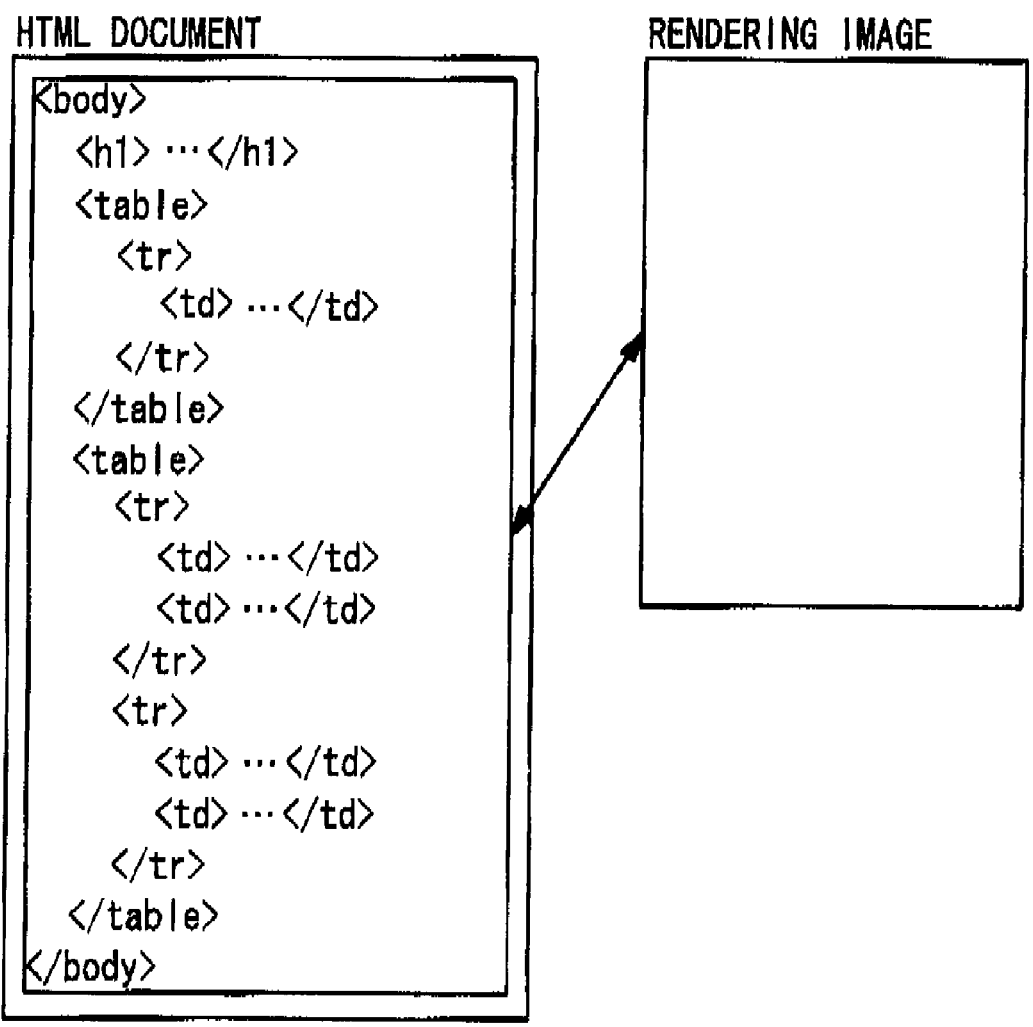
FIG. 4 is a diagram to explain the first embodiment of the present invention.
Figure 5:
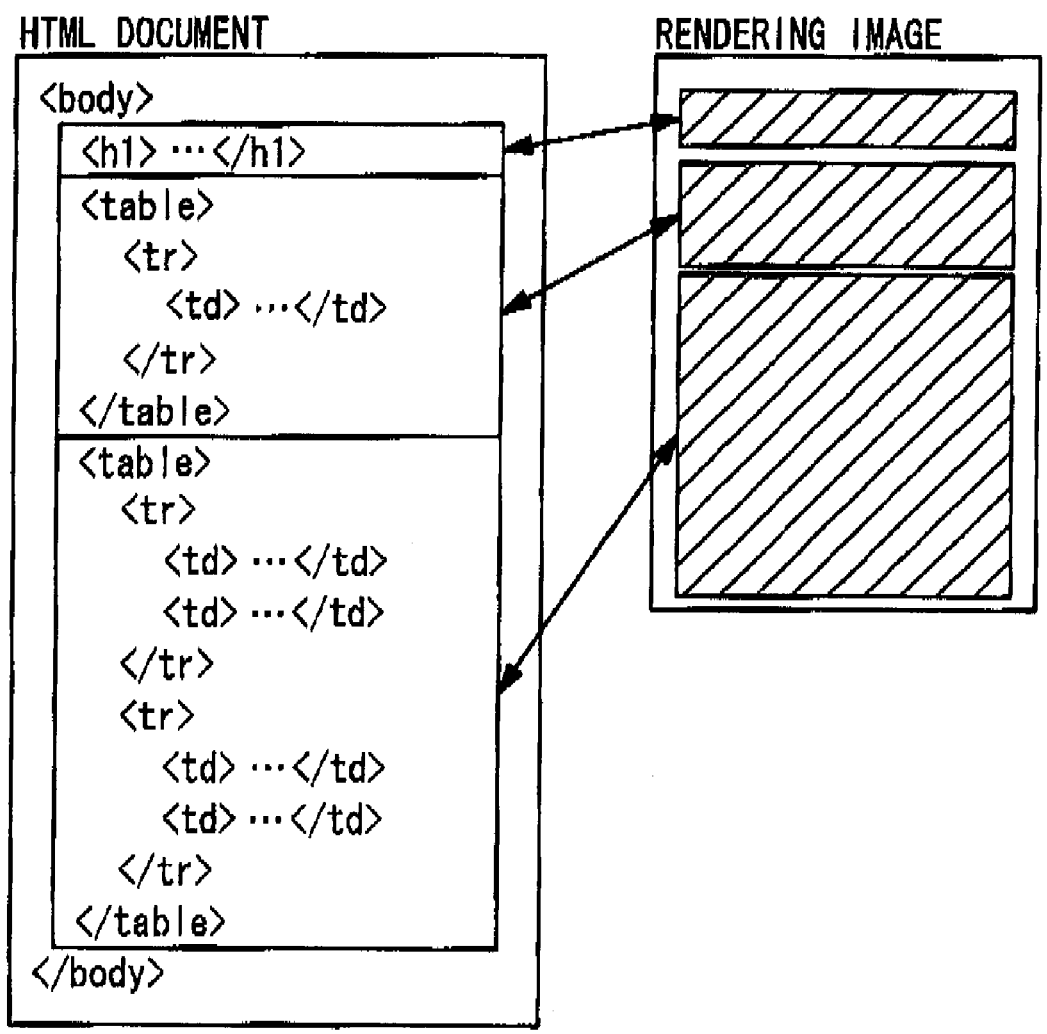
FIG. 5 is a diagram to explain the first embodiment of the present invention.

The central processing unit obtains the HTML document from the outside, renders the document, and stores rendering results shown in FIG. 3 in the memory device. The central processing unit obtains the rendering results, and initially references to the arrangement of "body" elements. As shown in FIG. 4, since there is no HTML element which is juxtaposed to the "body" element in the horizontal direction so that the "body" element can not be grouped, the central processing unit references to the arrangement of the elements of a child HTML document. As shown in FIG. 5, neither of an "h1" element and two "table" elements included in the elements of the child HTML document can be formed into a group since the element of the HTML document juxtaposed in the horizontal direction does not exist, so that the central processing unit references to the arrangement of elements of the further child HTML document.

Figure 6:
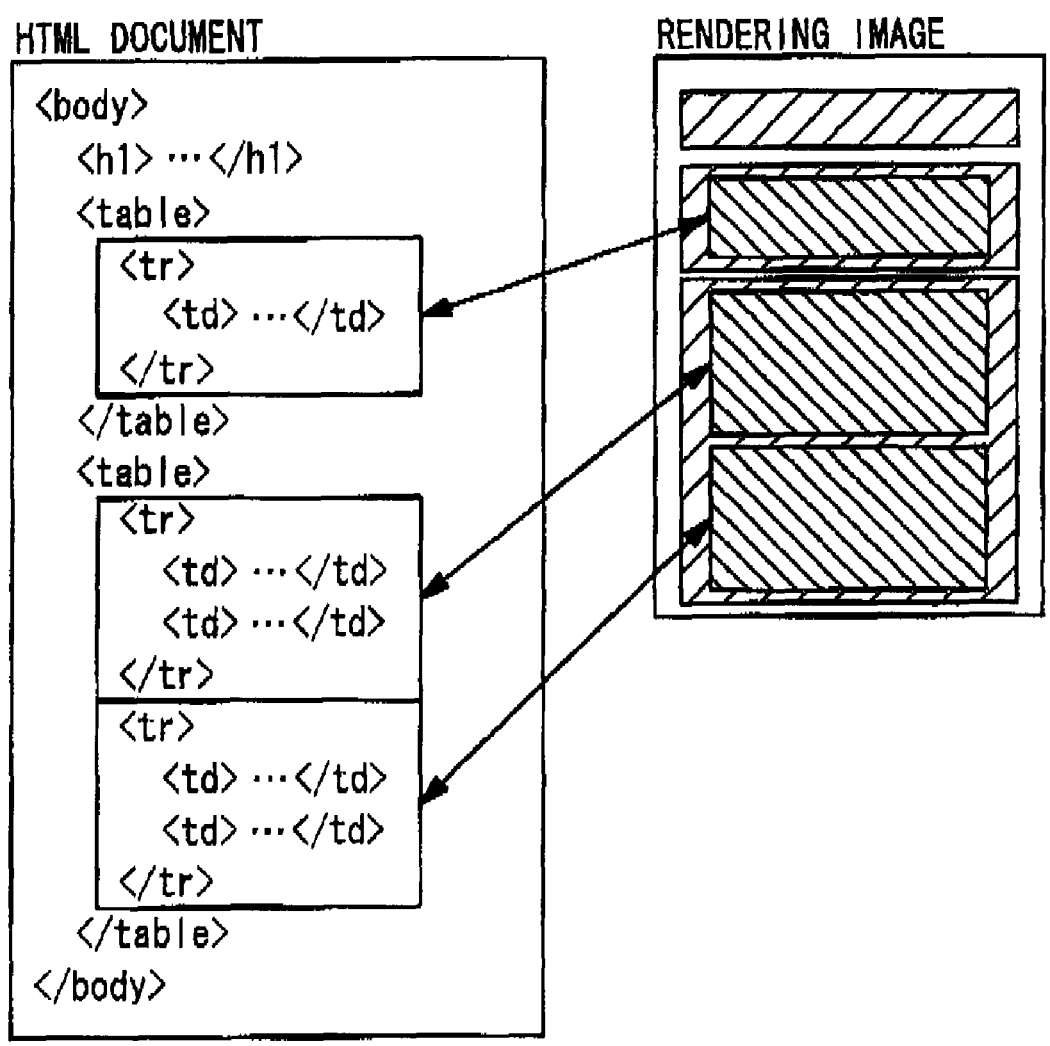
FIG. 6 is a diagram to explain the first embodiment of the present invention.
Figure 7:
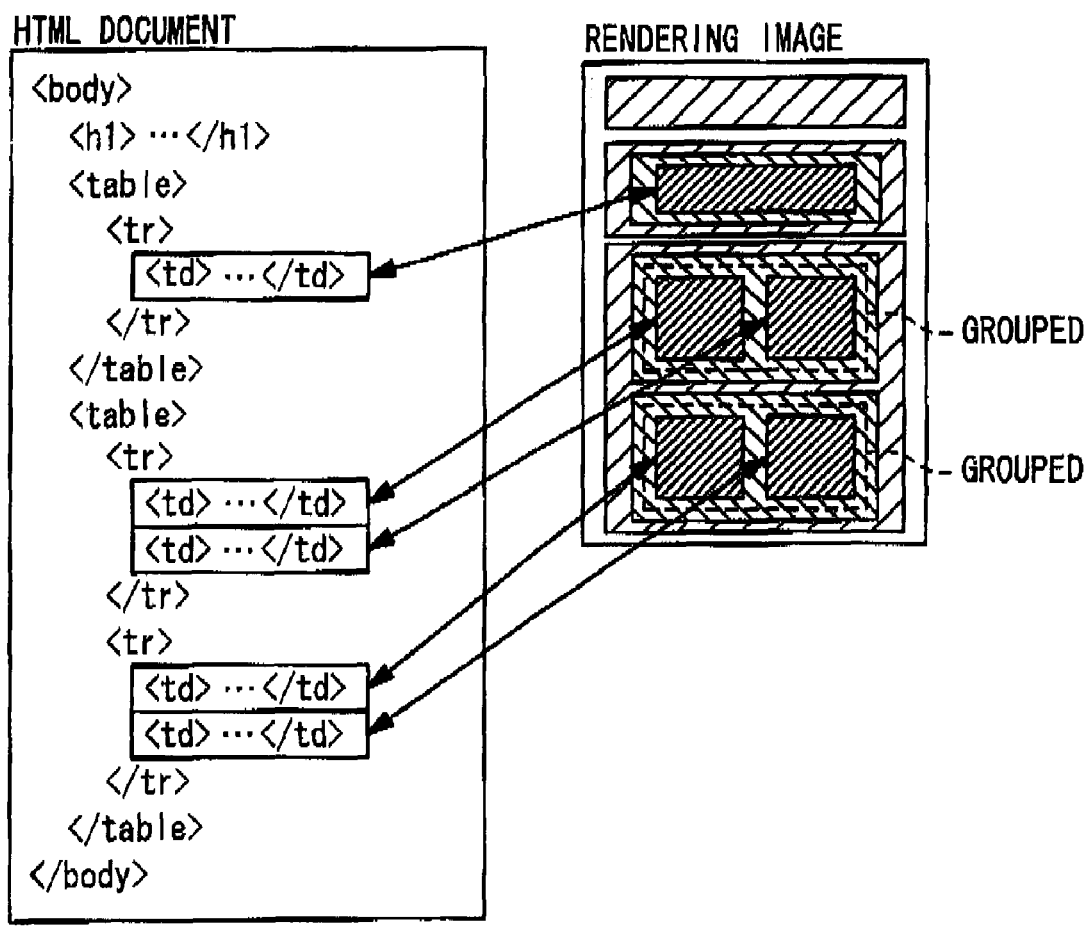
FIG. 7 is a diagram to explain the first embodiment of the present invention.

The "h1" element does not have a child element in the HTML document as shown in FIG. 5, so that the "h1" element is initially stored as a first layout component in the memory device. Next, in the first "table" element, since there is no HTML element juxtaposed to the "tr" element in the horizontal direction as shown in FIG. 6 so that the "tr" element can not be grouped, so that the central processing unit references to the arrangement of elements of the further child HTML document. Although the "td" element which is a child element of the HTML document has no HTML element juxtaposed in the horizontal direction as shown in FIG. 7 so that the "td" element can not be grouped, the "td" element has no child element in the HTML document so that the "td" element is stored in the memory device as the second layout component. Lastly, since in the second "table" element, two "tr" elements have no element in the HTML document juxtaposed in the horizontal direction and cannot be grouped, the central processing unit references the arrangement of further child elements in the HTML document.

In the first "tr" element, two "td" elements being child elements in the HTML document juxtaposed in the horizontal direction as shown in FIG. 7 are formed into a group, and the two "td" elements are stored in the memory device as third layout components. Also in the second "tr" element, two "td" elements being child elements in the HTML document juxtaposed in the horizontal direction as shown in FIG. 7 are formed into a group, and the two "td" elements are stored in the memory device as fourth layout components.

Figure 8:
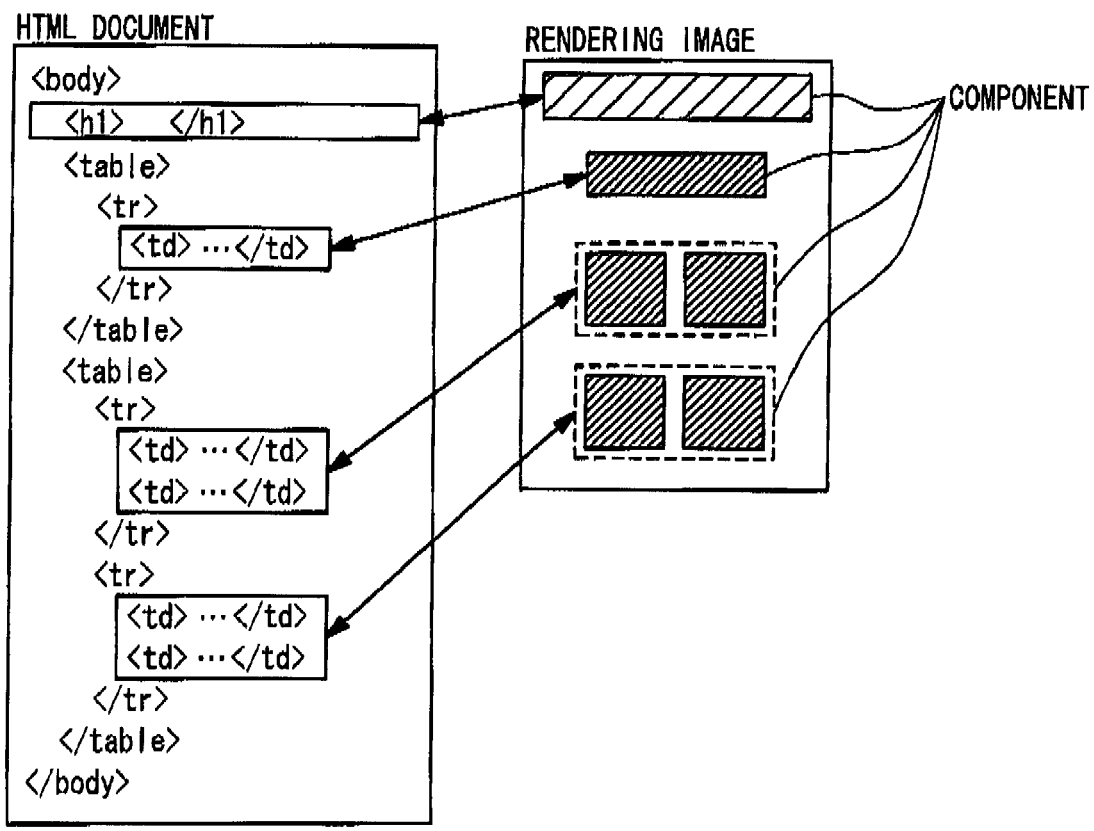
FIG. 8 is a diagram to explain the first embodiment of the present invention.
Figure 9:
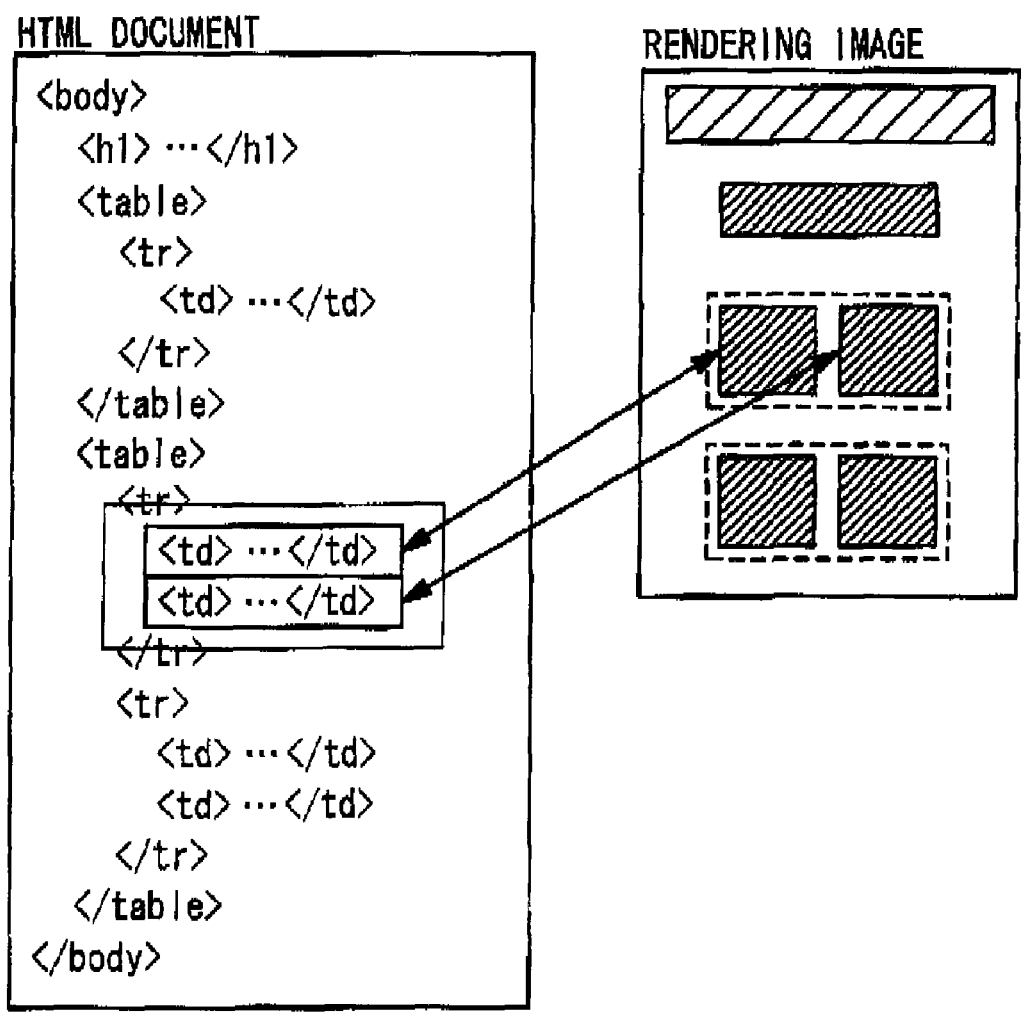
FIG. 9 is a diagram to explain the first embodiment of the present invention.

Due to the above process, the layout of the first hierarchy level as shown in FIG. 8 is analyzed. In the case of analyzing the layout of the second hierarchy, the arrangement of elements of the HTML document belonging to the components of the first hierarchy level layout are referenced, and the referenced elements in the HTML document which are juxtaposed in the perpendicular direction are grouped. For example, neither of the two "td" elements being element of the HTML document belonging to the third layout component as shown in FIG. 9 has an element of the HTML document juxtaposed in the perpendicular direction and cannot be formed into a group, so that the central processing unit references to the arrangement of child elements of the HTML document. Since the first "td" element does not have a child element of the HTML document as shown in FIG. 9, the "td" element is stored as a layout component in the memory device. Also in the second "td" element, a child element of the HTML document does not exist as shown in FIG. 9, so that the "td" element is stored as a layout component in the memory device. Due to the above process, the layout of the second hierarchy is analyzed.

The central processing unit obtains information of the analyzed layout components and the hierarchical relationship thereof from the memory device, shaping the layout components into a format expressed by using reference of elements of the HTML document, e.g. a format as shown in FIG. 10 for outputting.

Explained next will be the second implementation example of the present invention referring to drawings. This implementation example corresponds to the second embodiment of the present invention. This implementation example is provided with a personal computer as a data processing device and a data storage device.

The personal computer has a central processing unit which functions as an input unit, a layout analysis unit, an output unit and a title analysis unit, and a memory device, magnetic disc storage device which functions as a rendering result storage unit and an analysis result storage unit. Moreover, in the magnetic disc storage device, title analysis rules are stored as shown in FIG. 13.

Explanation made here will be targeted for the HTML document as shown in FIG. 3 as the structured/semi-structured document. The central processing unit obtains the HTML document from the outside, renders documents, and stores the rendering results as shown in FIG. 3 in the memory device.

Figure 14:
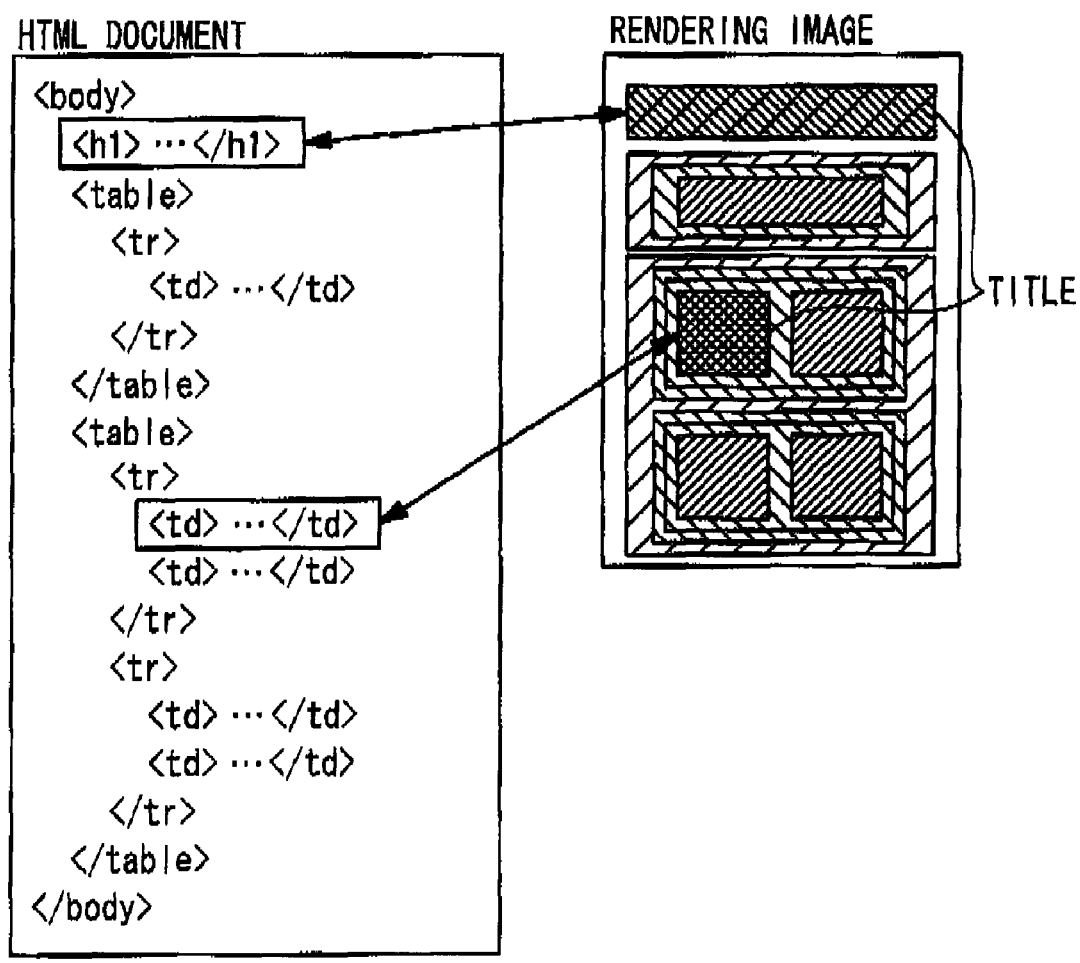
FIG. 14 is a diagram to explain the second embodiment of the present invention.

The central processing unit obtains the rendering results and the title analysis rules, and a "body" element is made to be an element of the HTML document being a object to be processed. Since the name, property, style and content of the "body" element failed to match the title analysis rules in a comparison with these rules, an element of a child HTML document of the "body" element, i.e. the "h1" element and the two "table" elements are newly added as the element of the HTML document being the object to be processed, in which the "h1" element is made to be an element of the HTML document as a subsequent object to be processed. Since the name, property, style and content of the "h1" element here match the title analysis rules in a comparison with these rules, the "h1" element is stored in the memory device as a title, in which the first "table" element is made to be an element of the HTML document as a subsequent processing object. The above process is repeated until no element of the HTML document being the object to be processed exists. For example, if an element of the HTML document being the object to be processed is the first "td" element in the first "tr" element of the second "table" element, the name, property, style and content of the "td" element are compared with the title analysis rules. If it is assumed that the td element has a specified background color with a height of 50 px and content of 5 characters, the comparison result exhibits consistency with the rule, so that the "td" element is stored as a title in the memory device. Due to the above process, the title analysis is realized as shown in FIG. 14.

The central processing unit obtains information of the analyzed title from the memory device, and shapes the title into a format expressed by using reference of the elements of the HTML document, e.g. a format as shown in FIG. 15 for outputting.

Next, the third implementation example of the present invention will be explained referring to the attached drawings. This implementation example corresponds to the third embodiment of the present invention. This implementation example is provided with a personal computer as a data processing device and a data storage device.

The personal computer has a central processing unit which functions as an input unit as a layout analysis unit, an output unit, a basic layout analysis unit, a title analysis unit and a layout analysis unit F, and a memory device, magnetic disc storage device which functions as a rendering result storage unit and an analysis result storage unit. Moreover, a title analysis rule is stored in the magnetic disc storage device.

Explanation made here will be targeted for the HTML document shown in FIG. 3 as the structured/semi-structured document. The central processing unit obtains the HTML document from the outside, renders the document, and stores the rendering results as shown in FIG. 3 in the memory device.

The central processing unit obtains the rendering results to analyze the layout component and the hierarchical relationship thereof. This function and operation are the same with those indicated in the first implementation example.

The central processing unit obtains the rendering results and the title analysis rule for analyzing a title. This function and operation are the same with those indicated in the second implementation example.

Figure 18:
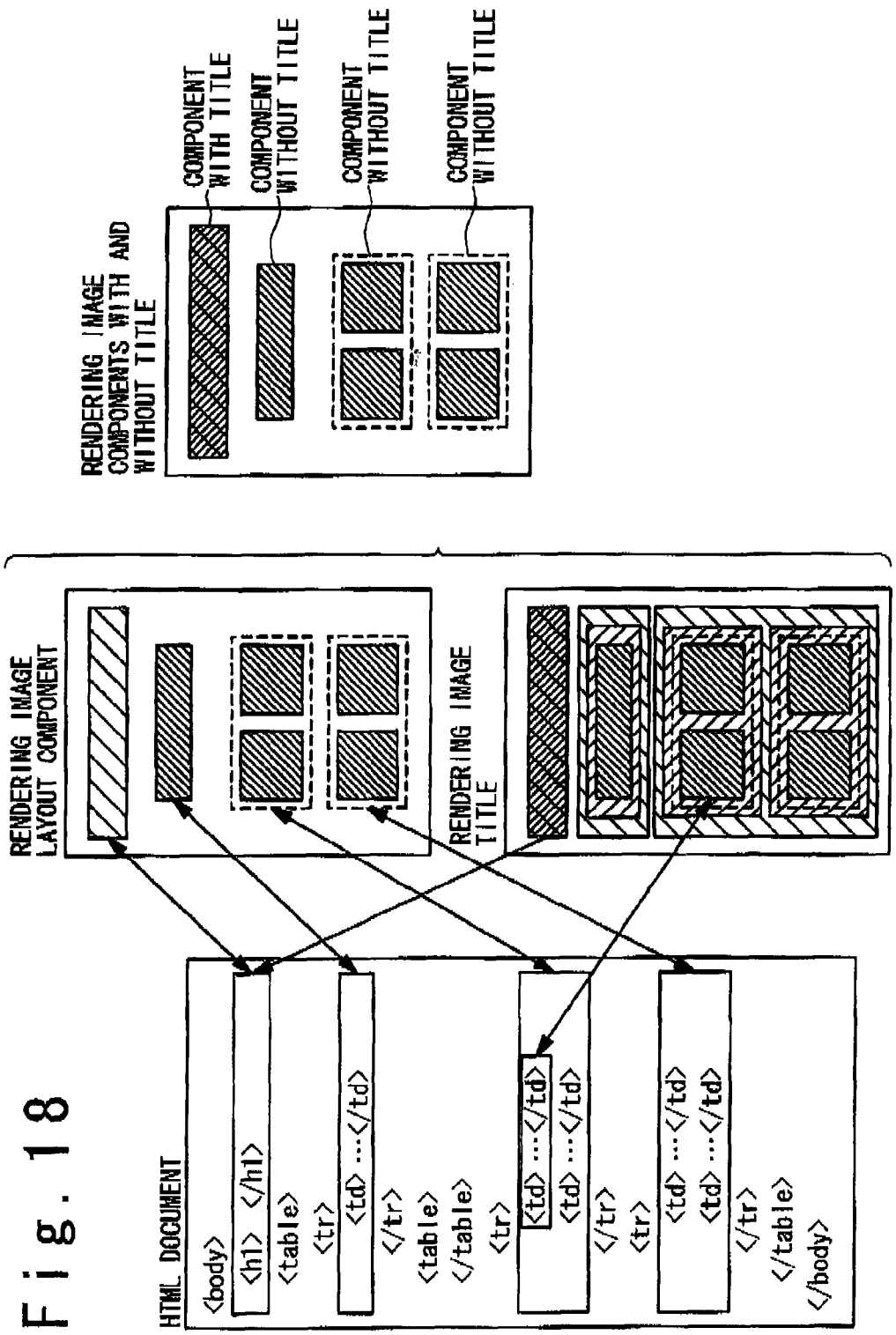
FIG. 18 is a diagram to explain the third embodiment of the present invention.

The central processing unit obtains the analyzed layout component with the hierarchical relationship thereof, and a title for analyzing the layout components of the first hierarchy level as the initial analysis target. Through investigating the inclusion relation between the first hierarchy level components in the layout and the titles, layout components with title and layout components without title can be analyzed as shown in FIG. 18. Since a layout component given by the first "td" element under the first "tr" element under the first "table" element under the "body" element does not have the title, it is formed into a group with the layout component with the title or with another layout component without the title.

Figure 19:
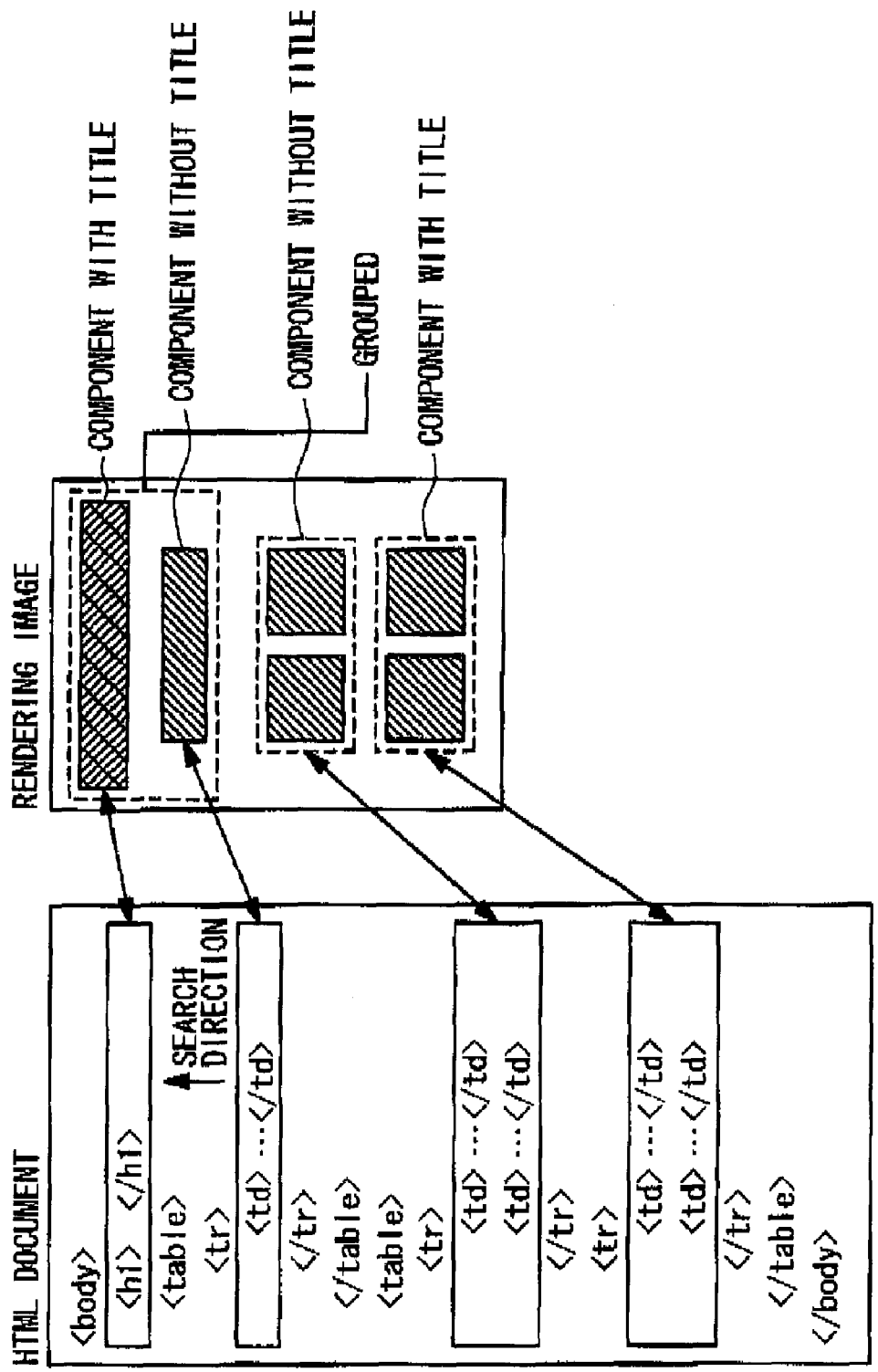
FIG. 19 is a diagram to explain the third embodiment of the present invention.

To be more specific, the layout component without title is formed into a group with a layout component with a title positioned in the shortest distance toward the forefront in a source to be seen from the component without a title as shown in FIG. 19, i.e. a layout component given by the "h1" element under the "body" element, and stored as a new layout component in the memory device. The above process is performed for all layout components without the title so as to analyze a new layout component of the first hierarchy level as shown in FIG. 20. A similar process is applied to the layout components of the second hierarchy level so as to analyze new layout components in the second hierarchy level.

The central processing unit obtains information of analyzed new layout components, a hierarchical relationship thereof, and a corresponding relationship between each of the components and the title from the memory device, and shapes the new layout components and the title into a format expressed by using reference of the elements of the HTML document, e.g. a format as shown in FIG. 21 for outputting.

Next, the fourth implementation example of the present invention will be explained referring to the attached drawings. This implementation example corresponds to the fourth embodiment of the present invention. This implementation example is provided with a personal computer as a data storage device.

The personal computer has a central processing unit which functions as an input unit, a document input unit, an index document output unit and an item document output unit, and a memory device, magnetic disc device which functions as a structured/semi-structured document storage unit and a layout document storage unit.

Explanation made here will be targeted for an HTML document shown in FIG. 24A as the structured/semi-structured, and an XML document shown in FIG. 24B as the document describing layout information of the HTML document.

When the user inputs an URL of http://www.nec.co.jp/news.html from a mobile phone, the central processing unit obtains the URL via the network, and further obtains the HTML document shown in FIG. 24A which corresponds to the URL, so as to storing them in the memory device. The central processing unit also analyzes the HTML document to obtain an URL of http://www.nec.co.jp/news.rdf of the document describing the layout information of the HTML document, and further obtains the XML document shown in FIG. 24B which corresponds to the URL, so as to storing them in the memory device.

Figure 25:
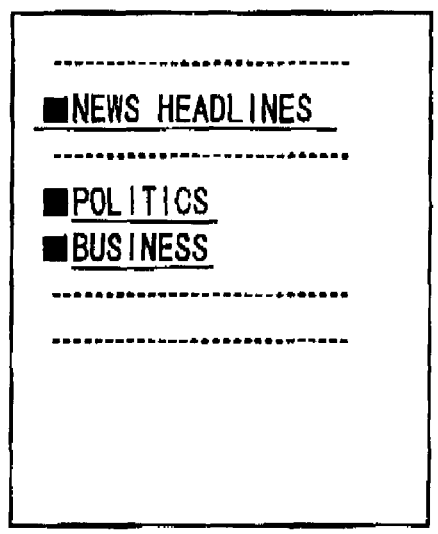
FIG. 25 is a diagram showing an example of the index document in the fourth embodiment of the present invention.

The central processing unit obtains the HTML document and the XML document from the memory device, extracting all components of the layout including "urn: layout: 1", "urn: layout: 2", "urn:layout: 2:1", and "urn:layout:2:2" from the XML document, so as to further extract /body[1]/h1[1],/body[1]/table[2]/tr[1]/td[1]/tab1 e[1]/tr[1],/body[1]/table[2]/tr[1]/td[2]/table[1]/tr[1] which are elements of the HTML document corresponding to titles for respective layout components. The elements of the HTML document corresponding to the titles are compared with the HTML document here, and each of contents including "new headlines", "politics" and "business" is extracted and arranged in order by adding an element of the HTML document such as an A element, so that an index document with a rendering image as shown in FIG. 25 is generated. The generated index document is presented to the user via the network and web browser of a mobile phone.

Figure 26:
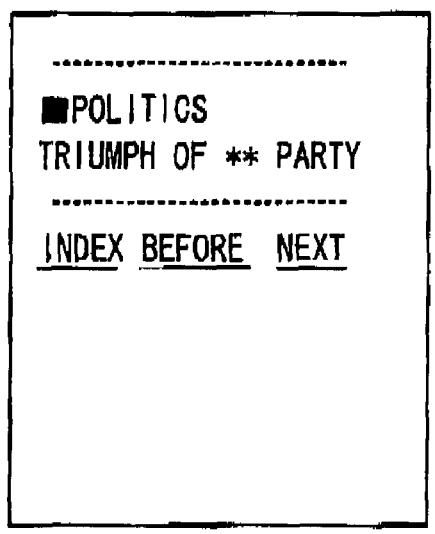
FIG. 26 is a diagram showing an example of the item document in the fourth embodiment of the present invention.

If the user selects "politics" from the presented index HTML document, the central processing unit obtains this information via the network, and extracts "urn: layout: 2: 1" which is the layout component with "politics" as the title from the XML document, so as to further extracts /body[1]/table[2]/tr[1]/td[1] which is the element of the HTML document belonging to the layout component. Moreover, the element of the HTML document corresponding to the component is compared with the HTML document to extract the content thereof, and the element of the HTML document is arranged in order by adding an element of the HTML document which has a purpose of navigation such as a link to the index, so that a document related to content of "politics" with a rendering image as shown in FIG. 26 is generated. The generated document is presented to the user via the network and the web browser of a mobile phone. If the user selects the index from the presented document, the central processing unit regenerates the index document to present the user. Moreover, if the user selects "previous" or "next" from the document, the central processing unit generates a document related to contents of "news headline" and "business" that are items previous and next to "politics", which is presented to the user.

Next, the fifth implementation example of the present invention will be explained referring to the attached drawings. This implementation example corresponds to the fifth embodiment of the present invention. This implementation example is provided with a personal computer as a data storage device.

The personal computer has a central processing unit which functions as a document input unit and a composite document output unit, and a memory device, magnetic disc drive which functions as a structured/semi-structured document storage unit. Moreover, information related to output components as shown in FIG. 29 is stored in the magnetic disc storage device.

Explanation made here will be targeted for HTML documents shown in FIGS. 24A and 30A as the structured/semi-structured document, and XML documents shown in FIGS. 24B and 303 as the document which describes the layout information of each of the HTML documents.

The central processing unit obtains two URLs of http://www.nec.co.jp/news.html and http://www.nec.co.jp/stock.html that are described in the information related to the output components, further obtaining the HTML documents shown in FIGS. 24A and 30A corresponding thereto, so as to storing them in the memory device. The central processing unit also analyze each of the HTML documents to obtain the URL http://www.nec.co.jp/news.rdf and http://www.nec.co.jp/stock.rdf that is the document which describes the layout information of the HTML document, and further obtains the XML documents shown in FIGS. 24B and 30B corresponding thereto, so as to storing them the memory device.

Figure 31:
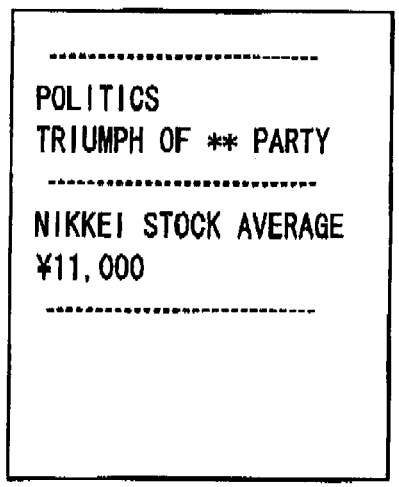
FIG. 31 is a diagram showing an example of the composite document in the fifth embodiment of the present invention.

The central processing unit obtains "urn: layout: 2: 1" and "urn: layout: 1" that are IDs of components outputted from the document corresponding to the two URLs, from the information related to the output components. The central processing unit further obtains the HTML documents and the XML documents from the memory device, so as to extract elements of the HTML documents corresponding to the IDs of the components outputted from the XML documents, i.e. /body[1]/table[2]/tr[1]/td[1]/table[1]/tr[1] for http://www.nec.co.jp/news.html, and /body[1]/table[1] for http://www.nec.co.jp/stock.html. These elements of the HTML documents corresponding to the components to output are compared with the HTML documents, being shaped and arranged in order, so that a composite document with a rendering image as shown in FIG. 31 is generated. The generated composite document is presented to the user via, for example, the network and the web browser of the mobile phone.

Next, the sixth implementation example of the present invention will be explained referring to the attached drawings. This implementation example corresponds to the ninth embodiment of the present invention. This implementation example is provided with a personal computer as a data processing device and a data storage device.

The personal computer has a central processing unit which functions as an input unit, a layout analysis unit, an output unit, a basic layout analysis unit, a title analysis unit, a layout analysis unit F, a block selection unit and a section calculation unit, and a memory device, magnetic disc storage device which functions as a rendering result storage unit and an analysis result storage unit. Moreover, a title analysis rule is stored in the magnetic disc storage device.

Figure 37:
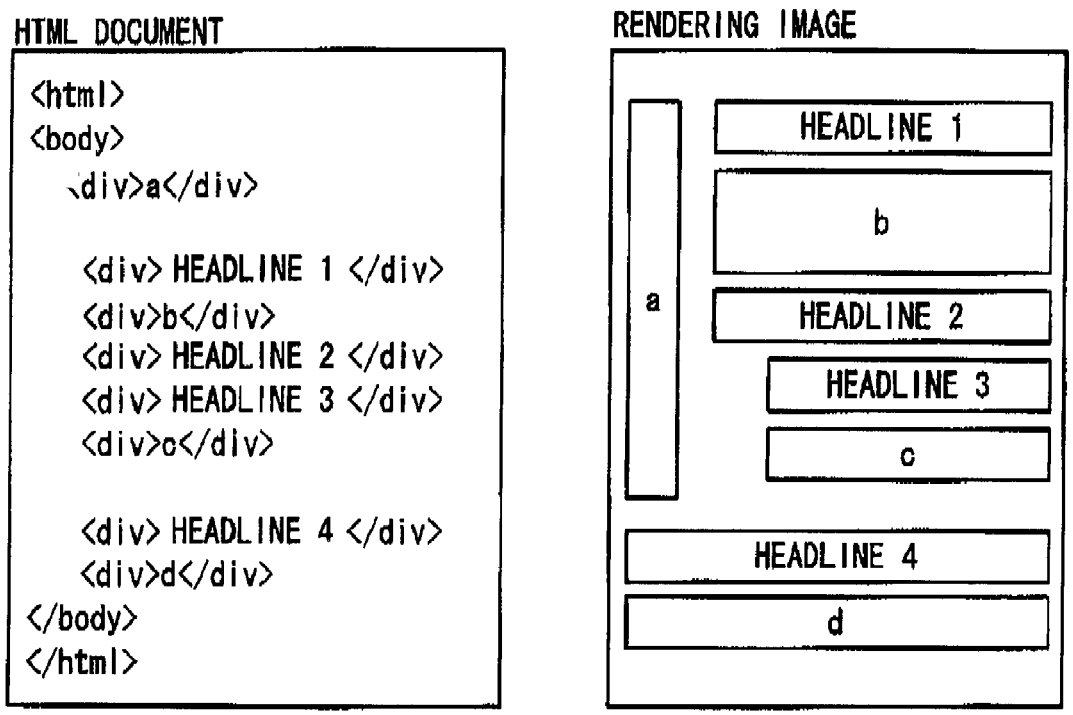
FIG. 37 is a diagram to explain the sixth implementation example of the present invention.

Explanation made here will be targeted for the HTML document shown in FIG. 37 as the structured/semi-structured document. The central processing unit obtains the HTML document from the outside, renders the document, and stores rendering results in the memory device.

The central processing unit obtains the rendering results to analyze first layout components and the hierarchical relationship thereof. This function and operation are the same with those indicated in the first implementation example.

The central processing unit obtains the rendering results and the title analysis rule to analyze the title. This function and operation are the same with those indicated in the second implementation example.

Figure 38:
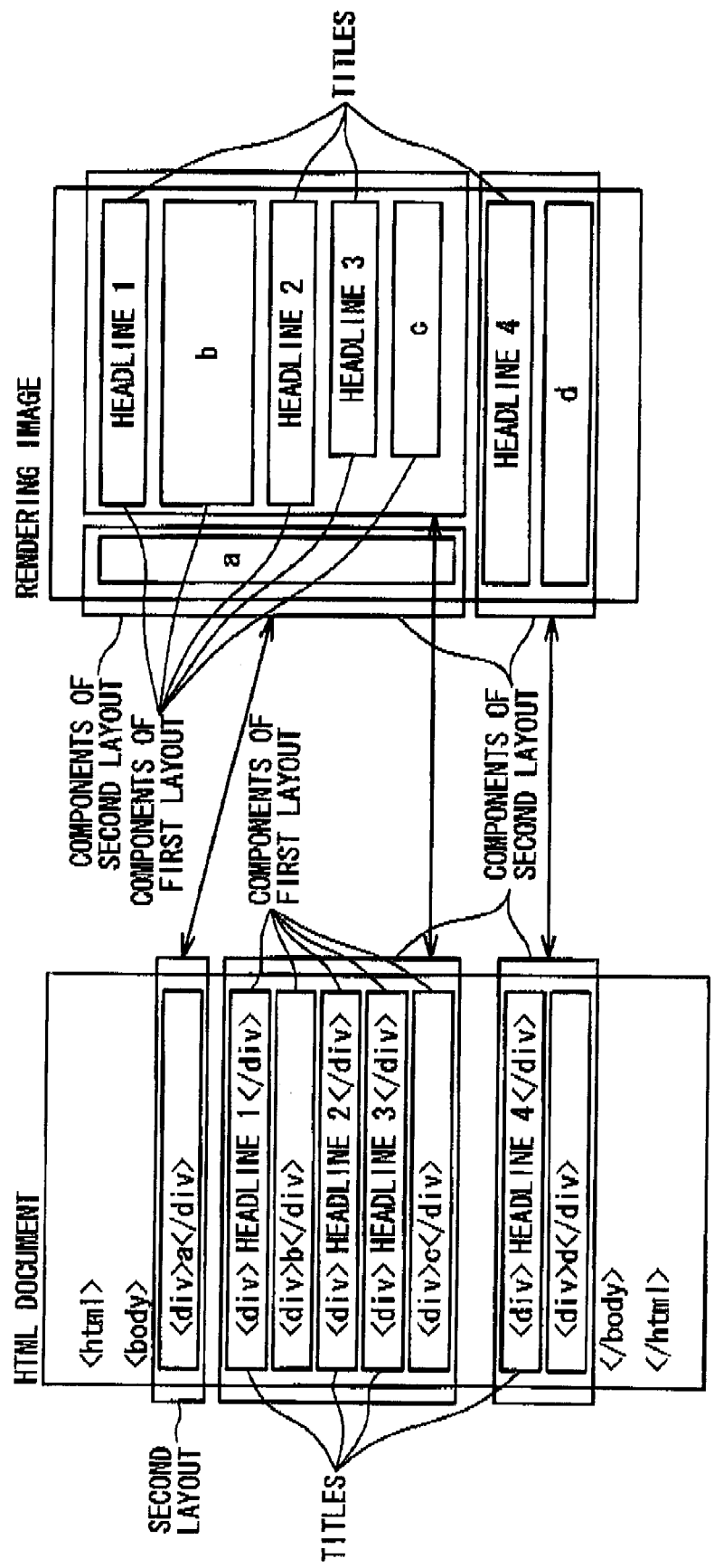
FIG. 38 is a diagram to explain the sixth implementation example of the present invention.

The central processing unit obtains the analyzed first layout and second layout to select one separable second layout component composed by components of the first layout which are made to be the object to be analyzed. FIG. 38 shows a state in the middle of the analysis. The second layout components of /body[1]/div[2] through div[6] are separable since two or more components with a title are included in the first layout components to compose the second components, i.e. components of /body[1]/div[2], /body[1]/div[3], . . . , /body[1]/div[6]. In this case, the components of /body[1]/div[2], /body[1]/div[3], . . . , /body[1]/div[6] respectively are made to be the first layout components which are the objects to be analyzed.

Figure 39:
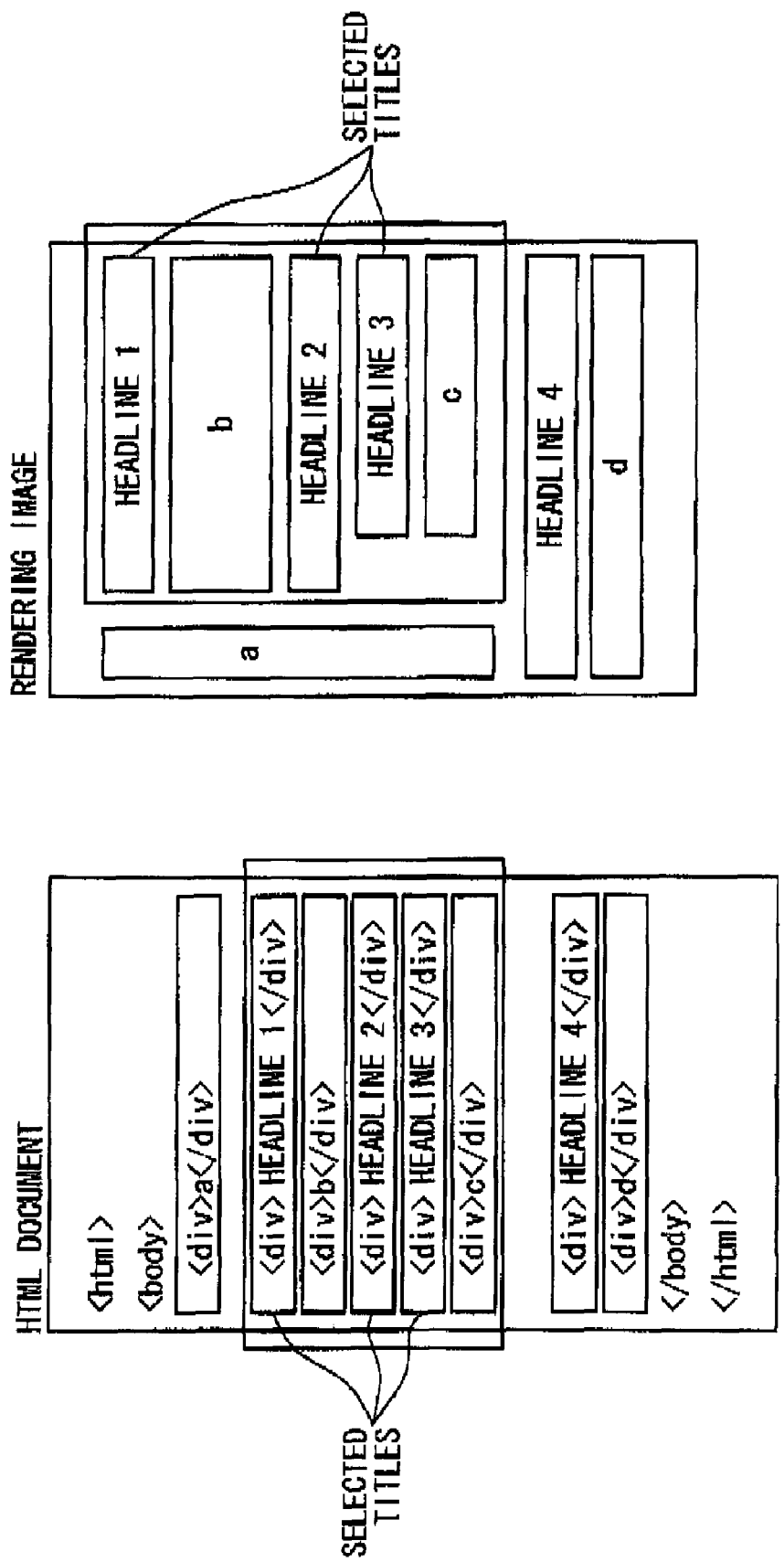
FIG. 39 is a diagram to explain the sixth implementation example of the present invention.
Figure 40:
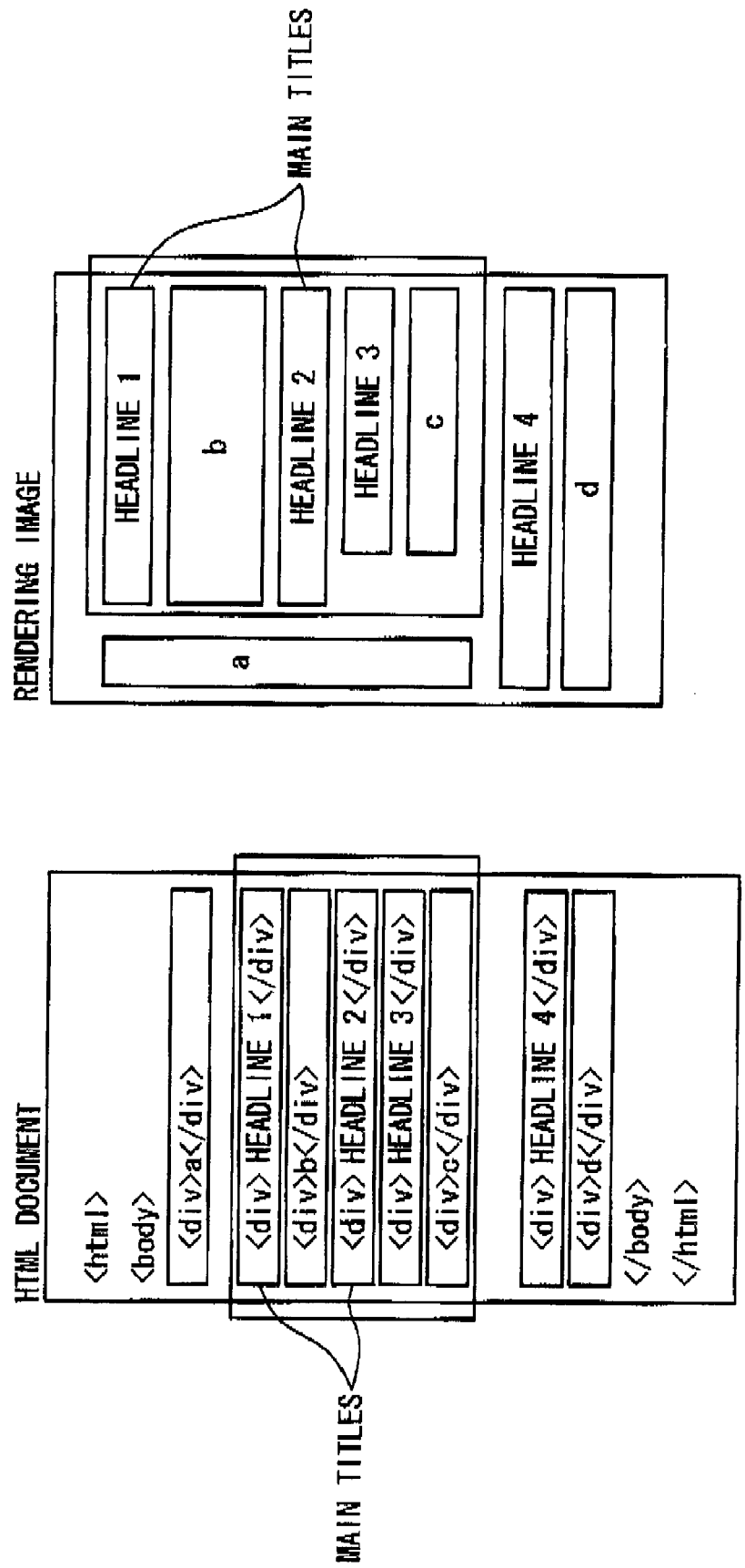
FIG. 40 is a diagram to explain the sixth implementation example of the present invention.
Figure 41:
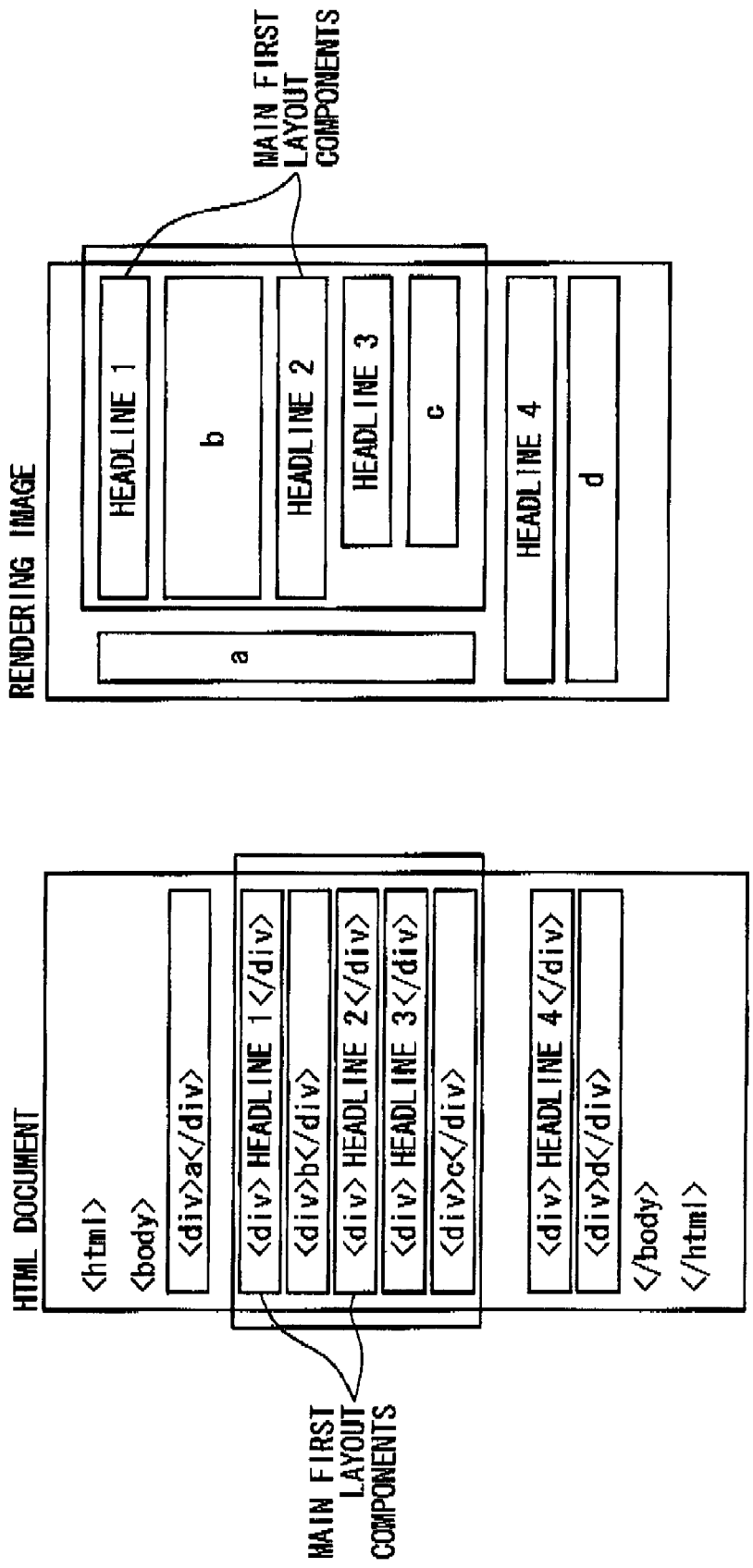
FIG. 41 is a diagram to explain the sixth implementation example of the present invention.

The central processing unit obtains analyzed titles, and selects a title included in the first layout component which is the object to be analyzed as shown in FIG. 39. Moreover, the positions of the selected titles are checked so that, as shown in FIG. 40, the titles of /body[1]/div[2] and/body[1]/div[4], the left end of which are positioned within a predetermined distance from the starting point in the left end of the title of /body[1]/div[2], which is positioned in the leftmost, in the horizontal direction are selected as the main titles. Furthermore, as shown in FIG. 41, the first layout components including the main title are made to be main components.

Figure 42:
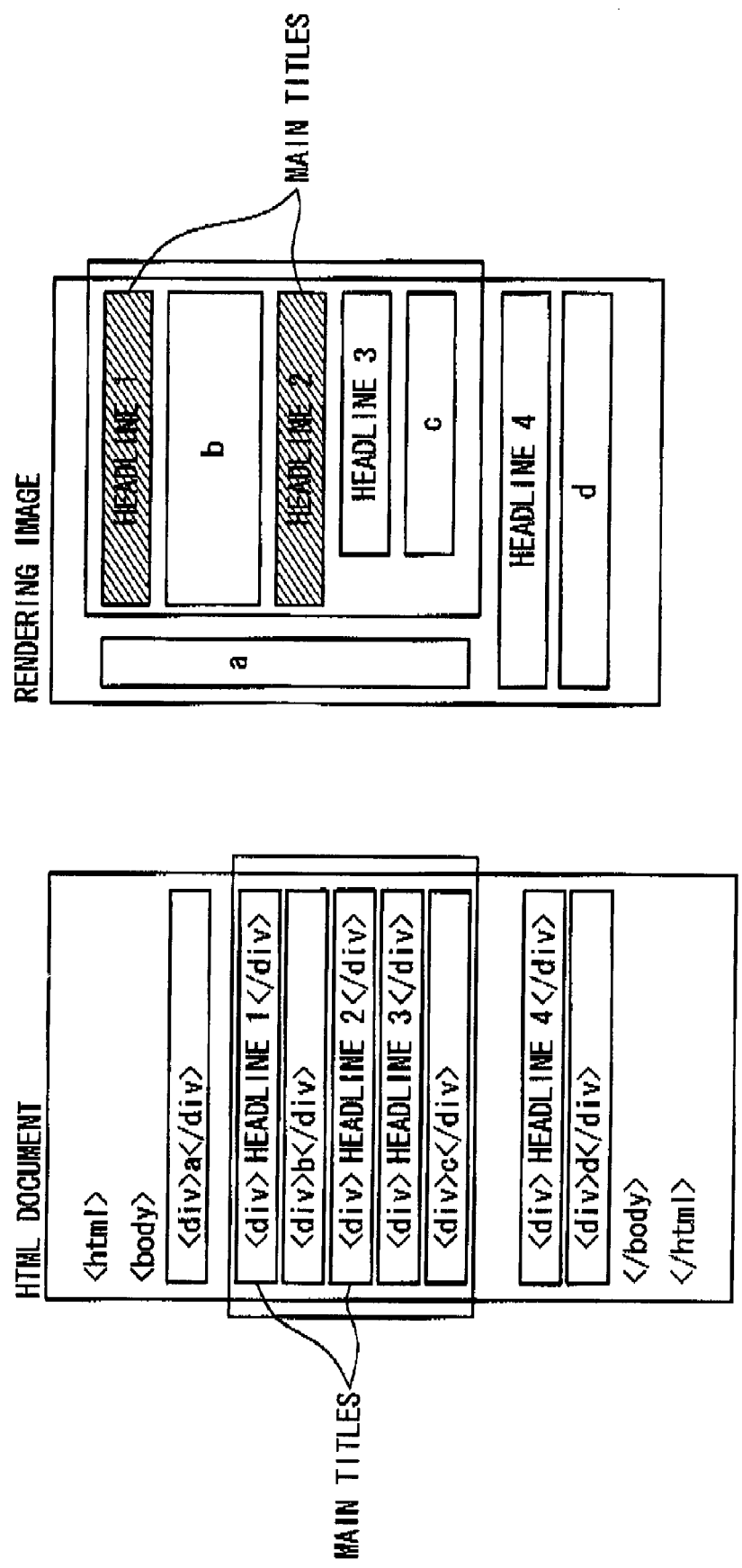
FIG. 42 is a diagram to explain the sixth implementation example of the present invention.
Figure 43:
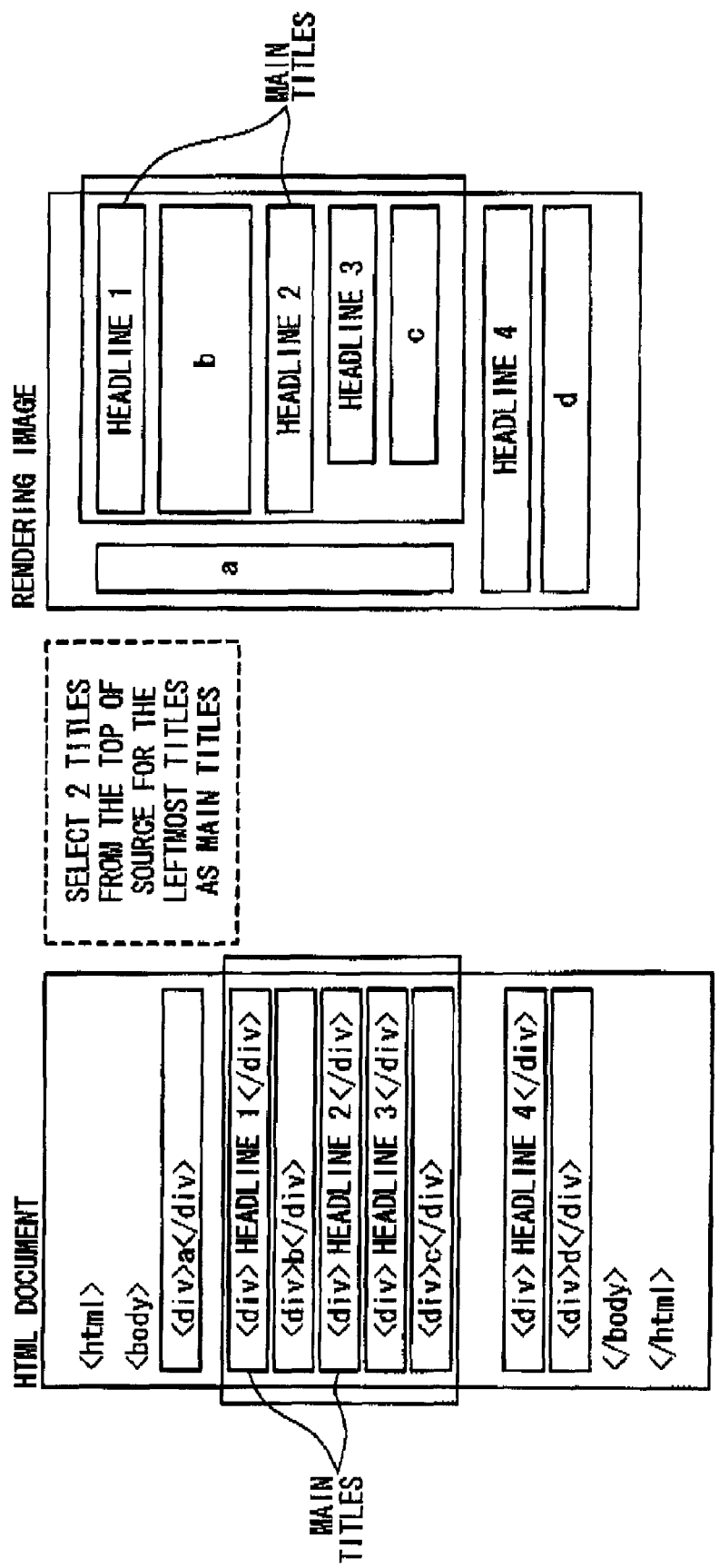
FIG. 43 is a diagram to explain the sixth implementation example of the present invention.

As a method for selecting the main titles, a method to select titles with a similar style such as a background color as a main title as shown in FIG. 42, a method which uses the position as reference and select titles with a fixed number or a fixed rate as a main title as shown in FIG. 43, and a method to select the main title in combination of the similarities of the position or the style may be used.

Figure 44:
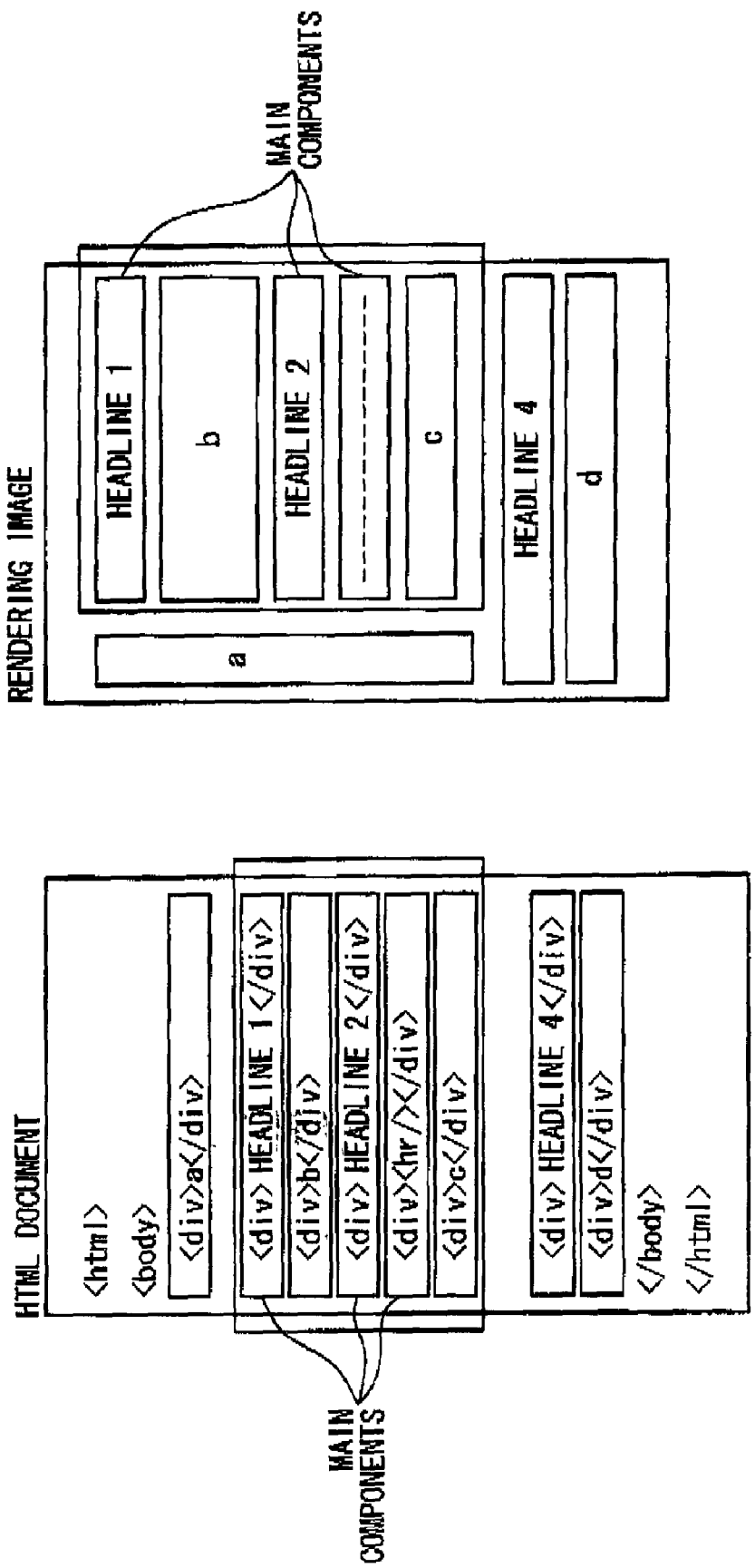
FIG. 44 is a diagram to explain the sixth implementation example of the present invention.

It may also be determined whether or not the first layout component which is the analysis object is the boundary line as shown in FIG. 44, so as to set a component determined as the boundary line as the main component. Depending on content of a component here, a component of /body[1]/div[5] with the "hr" element is made to be a main component. As a method to determine the boundary line, the width and height of the first layout component being the analysis object, the style such as a boundary of document description elements to compose the component, and the width and height of an image which is a content of the document description element to compose the components, may be used.

The central processing unit forms, as shown in FIG. 45, a non-main component into a group with a main component or another non-main component on the basis of a distance in the source, so as to generate a new second layout component. For example, the non-main component of /body[1]/div[3] is formed into a group with the component of /body[1]/div[2] which is the main component in the shortest distance toward the forefront on the source. Two new second layout components analyzed here are stored in the memory device as children of the original second layout component. The analyzed second layout components may be replaced with the original second layout component and stored in the memory device, or it may be selected whether to store by replacing or to store as children on the basis of the style or the content of the original second layout component and the analyzed second layout components. It is possible to completely analyze the second layout components and the hierarchical relationship thereof by applying a similar process to the separable second layout component.

The central processing unit obtains information of the analyzed second layout components, the hierarchical relationship thereof, and a corresponding relationship between each of the components and the title from the memory device, shaping the second layout components and the title into a format expressed with reference to the elements of the HTML document, e.g. a format indicated in the third implementation example, for outputting. An ID may be given to a layout component to output here.

By implementing the above embodiments, the objects of the present invention described as problems to be solved can be achieved.

A first document analysis system according to the present invention has the basic layout analysis unit (14 in FIG. 1) to obtain rendering results of the structured/semi-structured document and analyze a layout by grouping juxtaposed document description elements referring to an arrangement of the document description elements, and the output unit (13 in FIG. 1) to output the analyzed layout in a format which expresses layout components using reference of the document description elements. The first and third objects of the present invention can be achieved by employing the configuration as stated above and analyzing a layout on the basis of an arrangement of document description elements for outputting the analyzed layout in a format which can be utilized by the third person.

A second document analysis system according to the present invention has the title analysis rule storage unit (23 in FIG. 11) to store the title analysis rule, the title analysis unit (15 in FIG. 11) to obtain the rendering results of the structured/semi-structured document and the title analysis rule for analyzing a title by comparing the property, style, contents as well as the name of document description elements with the title analysis rule, and the output unit (13 in FIG. 11) to output the analyzed title in a format expressed with reference to the document description elements. The second and third objects of the present invention can be achieved by employing the configuration as stated above and analyzing a title comprehensively by using the property, style and contents as well as the name of the document description elements for outputting the analyzed title in a format which can be utilized by the third person.

A third document analysis system according to the present invention has the title analysis rule storage unit (23 in FIG. 16) to store the title analysis rule, the basic layout analysis unit (14 in FIG. 16) to obtain the rendering results of the structured/semi-structured document and analyze a layout by grouping the juxtaposed document description elements referring to an arrangement of the document description elements, the title analysis unit (15 in FIG. 16) to obtain the rendering results of the structured/semi-structured document and the title analysis rule so as to analyze a title by comparing the name, property, style and content of the document description elements with the title analysis rule, the layout analysis unit (16 in FIG. 16) to obtain the layout analyzed in the basis analysis unit and the title analyzed in the title analysis unit so as to generate a new layout by forming a layout component without the title into a group with the layout component with the title or another layout component without the title, and the output unit (13 in FIG. 16) to output the analyzed new layout in a format which expresses the layout component and the title using reference to the document description elements. The first, second and third objects of the present invention can be achieved by employing the configuration as stated above, generating a new layout wherein a group of related components with a title as representative information is made to be a new component, and outputting an analyzed layout and title in a format which can be utilized by the third person.

A first document adaptation system according to the present invention has the input unit (51 in FIG. 22) to obtain the URI (uniform resource identifier) of the structured/semi-structured document desired by the user or control an output of an index document and the document describing index item contents by obtaining the user input, the document input unit (52 in FIG. 22) to obtain a document corresponding to the URI of the structured/semi-structured document desired by the user and obtain a document describing layout information corresponding to the obtained document, the index document output unit (53 in FIG. 22) to obtain the structured/semi-structured document desired by the user and the document describing layout information of the structured/semi-structured document so as to generate and output the index document, and the index document output unit (54 in FIG. 22) to obtain the structured/semi-structured document desired by the user and the document describing the layout information of the structured/semi-structured document so as to generate and output a document describing specified index item contents. By employing the configuration as stated above, and generating/outputting an index document and the document describing index item contents using the structured/semi-structured document and a document describing layout information which appropriately reflects a logical structure of the structured/semi-structured document, it is made possible to browse a document using an index which precisely captures the logical structure of the document intended by the document provider, so that the fourth object of the present invention can be achieved.

A second document adaptation system according to the present invention has the output component storage unit (81 in FIG. 27) to store information related to output components, the document input unit (71 in FIG. 27) to obtain the information related to the output components, the structured/semi-structured document corresponding to the URI described in the information, and a document describing layout information corresponding to the obtained document, and the composite document output unit (72 in FIG. 27) to generate and output a composite document by obtaining the information related to the output components, the structured/semi-structured document, and the document describing the layout information of the structured/semi-structured document. By employing the configuration as described above and generating/outputting a composite document composed of specified layout components using the information related to output components, the structured/semi-structured document, and the document describing layout information which appropriately reflects the logical structure of the structured/semi-structured document, it is made possible to browse a necessary part of a document using the composite document which precisely captures the logical structure of the document intended by the document provider, so that the fourth object of the present invention can be achieved.

The invention claimed is:
1. A document analysis system comprising:
a processor, the processor functioning as:
  an input unit that receives a document, the document comprising one of structured document or a semi-structured document, renders the received document, and stores the rendered document as an image in a storage unit;
  a basic layout analysis unit that groups document description elements of the document included in the image that are juxtaposed in a horizontal or vertical direction in the image, relates the grouped document description elements to layout components of the document that describe a layout of the document description elements of the document, and stores the related grouped document description elements and layout components in the storage unit; and an output unit that outputs the layout based on the stored related grouped document description elements and layout components, the layout identifying the layout components, the layout components referencing the grouped document description elements.

2. The document analysis system according to claim 1, further comprising:
a title analysis rule storing unit that stores a title analysis rule that defines at least one information piece of a name, an attribute, a style and a content of a title included in the document;
a title analysis unit that determines whether a document description element included in the document includes the at least one information piece of the name, the attribute, the style and the content of the title, based on the title analysis rule, determines that the document description element is a title element of the document, relates the document description element to a title component of the document, and stores the related document description element in the storage unit; and
a layout analysis unit that generates a new layout comprising the layout components and the title component.

3. The document analysis system according to claim 2, wherein the layout analysis unit comprises:
a block selection unit that selects main components of the layout based on the layout components, the title component, and the new layout; and
a section calculation unit that generates the new layout by grouping the layout components of the layout based on the layout, the new layout, and the main components of the layout.

4. The document analysis system according to any of claims 1 to 3, wherein the basic layout analysis unit analyzes the layout by grouping document description elements juxtaposed in a direction orthogonal to the horizontal or vertical direction by referencing an arrangement of the grouped document description elements and a child of the grouped document description elements.

5. The document analysis system according to claim 1, wherein the basic layout analysis unit analyzes a layout of a next hierarchy level by grouping document description elements juxtaposed in a direction orthogonal to the horizontal or vertical direction by referencing an arrangement of the grouped document description elements and a child of the grouped document description elements on a display screen.

6. The document analysis system according to claim 1, wherein the basic layout analysis unit references only an arrangement of a specified part of the document analysis elements.

7. The document analysis system according to claim 1, further comprising:
an index document output unit generates and outputs an index document based on the document and information of the layout of the document; and
an item document output unit that generates and outputs a document which describes a content of an item of the index document based on the information of the layout.

8. The document adaptation system, according to claim 1, further comprising:
an output component information storing unit that stores a URI of the document and an ID of an output component of the document as output component information; and
a composite document output unit that generates and outputs a composite document based on the output component information, the document corresponding to the URL described in the output component information, and information of the layout of the document.

9. A document analysis system comprising:
a processor, the processor functioning as:
an input unit that receives a document, the document comprising one of structured document or a semi-structured document, renders the received document, and stores the rendered document as an image in a storage unit;
a basic layout analysis unit that groups document description elements of the document included in the image that are juxtaposed in a horizontal or vertical direction in the image, relates the grouped document description elements to layout components of the document that describe a layout of the document description elements of the document, and stores the related grouped document description elements and layout components in the storage unit;
a title analysis rule storing unit that stores a title analysis rule that defines at least one information piece of a name, an attribute, a style and a content of a title included in the document;
a title analysis unit that determines whether the document description elements included in the document includes the at least one information piece of the name, the attribute, the style and the content of the title, based on the title analysis rule, determines that the document description elements are a title element of the document, relates the document description elements to a title component of the document, and stores the related document description elements in the storage unit;
an output unit that outputs the layout of the title of the document based on the layout component and the title element of the related document description elements in a format that references the document description elements.

10. A document analysis method comprising:
receiving, by a processor, a document, the document comprising one of structured document or a semi-structured document, rendering the received document, and storing the rendered document as an image in a storage unit;
grouping document description elements of the document included in the image that are juxtaposed in a horizontal or vertical direction in the image, relating the grouped document description elements to layout components of the document that describe a layout of the document description elements of the document, and storing the related grouped document description elements and layout components in the storage unit; and
outputting the layout based on the stored related grouped document description elements and layout components, the layout identifying the layout components, the layout components referencing the grouped document description elements.

11. The document analysis method according to claim 10, further comprising:
storing a title analysis rule that defines least one information piece of a name, an attribute, a style and a content of a title included in the document,
determining whether a document description element included in the document includes the at least one information piece of the name, the attribute, the style and the content of the title, based on the title analysis rule;
determining that the document description element is a title element of the document;
relating the document description element to a title component of the document;

storing the related document description element in the storage unit; and generating a new layout comprising the layout components'and the title component.

12. The document analysis method according to claim 11, wherein the generating the new layout comprises:

selecting main components of the layout based on the layout components, the title component, and the new layout; and generating the new layout by grouping the layout components of the layout based on the layout, the new layout, and the main components of the layout selected by the.

13. The document analysis method according to any of claims 10 to 12, wherein the analyzing the layout comprises:

grouping document description elements juxtaposed in a direction orthogonal to the horizontal or vertical direction by referencing an arrangement of the grouped document description elements and a child of the grouped document description elements on a display screen.

14. The document analysis method according to claim 10, wherein the analyzing the layout comprises analyzing a layout of a next hierarchy level by grouping document description elements juxtaposed in a direction orthogonal to the horizontal or vertical direction by referencing an arrangement of the grouped document description elements and a child of the grouped document description elements on a display screen.

15. The document analysis method according to claim 10, wherein the analyzing the layout comprises:

referencing only an arrangement of a specified part of the document analysis elements.

16. The document analysis method according to claim 10, further comprising:

generating and outputting an index document based on the document and information of the layout of the document; and generating and outputting a document which describes a content of an item of the index document based on the information of the layout.

17. The document analysis method according to claim 10, further comprising:

storing a URI of the document and an ID of an output component of the document as output component information; and generating and outputting a composite document based on the output component information, the document corresponding to the URL described in the output component information, and information of the layout of the document.

18. A document analysis method comprising:

receiving, by a processor, a document, the document comprising one of structured document or a semi-structured document, rendering the received document, and storing the rendered document as an image in a storage unit;

grouping document description elements of the document included in the image that are juxtaposed in a horizontal or vertical direction in the image;

relating the grouped document description elements to layout components of the document that describe a layout of the document description elements of the document;

storing the related grouped document description elements and layout components in the storage unit;

storing a title analysis rule that defines at least one information piece of a name, an attribute, a style and a content of a title included in the document;

determining whether the document description elements included in the document includes the at least one information piece of the name, the attribute, the style and the content of the title, based on the title analysis rule;

determining that the document description elements are a title element of the document;

relating the document description elements to a title component of the document;

storing the related document description elements in the storage unit; and outputting the layout and the title of the document based on the layout component and the title component of the related document description elements in a format that references the document description elements.

19. A non-transitory recording medium storing a program code for executing a process by computer, the process comprises:

receiving a document, the document comprising one of structured document or a semi-structured document, rendering the received document, and storing the rendered document as an image in a storage unit;

grouping document description elements of the document included in the image that are juxtaposed in a horizontal or vertical direction in the image, relating the grouped document description elements to layout components of the document that describe a layout of the document description elements of the document, and storing the related grouped document description elements and layout components in the storage unit; and outputting the layout based on the stored related grouped document description elements and layout components, the layout identifying the layout components, the layout components referencing the grouped document description elements.

20. A recording medium according to claim 19, wherein the process further comprises:

storing a title analysis rule that defines least one information piece of a name, an attribute, a style and a content of a title included in the document, determining whether a document description element included in the document includes the at least one information piece of the name, the attribute, the style and the content of the title, based on the title analysis rule;

determining that the document description element is a title element of the document;

relating the document description element to a title component of the document;

storing the related document description element in the storage unit; and generating a new layout comprising the layout components and the title component.

21. The recording medium according to claim 20, wherein the generating the new layout comprises:

selecting main components of the layout based on the layout components, the title component, and the new layout; and generating the new layout by grouping the layout components of the layout based on the layout, the new layout, and the main components of the layout selected by the.

22. The recording medium according to claim 19, wherein the analyzing the layout comprises:

grouping document description elements juxtaposed in a direction orthogonal to the horizontal or vertical direction by referencing an arrangement of the grouped document description elements and a child of the grouped document description elements on a display screen.

23. The recording medium according to claim 19, wherein the analyzing the layout comprises analyzing a layout of a next hierarchy level by grouping document description elements juxtaposed in a direction orthogonal to the horizontal or vertical direction by referencing an arrangement of the grouped document description elements and a child of the grouped document description elements on a display screen.

24. The recording medium according to claim 19, wherein the analyzing the layout comprises:
referencing only an arrangement of a specified part of the document analysis elements.

25. The recording medium according to any of claims 19 to 24, wherein the process further comprises:
generating and outputting an index document based on the document and information of the layout of the document; and
generating and outputting a document which describes a content of an item of the index document based on the information of the layout.

26. The recording medium according to any of claims 19 to 24, wherein the process further comprises:
storing a URI of the document and an ID of an output component of the document as output component information; and
generating and outputting a composite document based on the output component information, the document corresponding to the URL described in the output component information, and information of the layout of the document.

27. A recording medium storing a program code for executing a process by computer, the process comprises:
receiving, by a processor, a document, the document comprising one of structured document or a semi-structured document, rendering the received document, and storing the rendered document as an image in a storage unit;
grouping document description elements of the document included in the image that are juxtaposed in a horizontal or vertical direction in the image;
relating the grouped document description elements to layout components of the document that describe a layout of the document description elements of the document;
storing the related grouped document description elements and layout components in the storage unit;
storing a title analysis rule that defines at least one information piece of a name, an attribute, a style and a content of a title included in the document;
determining whether the document description elements included in the document includes the at least one information piece of the name, the attribute, the style and the content of the title, based on the title analysis rule;
determining that the document description elements are a title element of the document;
relating the document description elements to a title component of the document;
storing the related document description elements in the storage unit; and
outputting the layout and the title of the document based on the layout component and the title component of the related document description elements in a format that references the document description elements.

* * * * *

UNITED STATES PATENT AND TRADEMARK OFFICE
CERTIFICATE OF CORRECTION

PATENT NO. : 8,051,371 B2
APPLICATION NO. : 11/577984
DATED : November 1, 2011
INVENTOR(S) : Yuushin Tatsumi It is certified that error appears in the above-identified patent and that said Letters Patent is hereby corrected as shown below:

In the Specification

Column 12, Line 66: After "(step S323)" insert -- , --

Column 14, Line 42: Delete "It" and insert -- If --, therefor

Column 20, Line 56: Delete "likes" and insert -- like, --, therefor

Column 25, Line 9 (approx): Delete "303" and insert -- 30B --, therefor

In the Claims

Column 30, Line 32: In Claim 9, delete "layout of" and insert -- layout and --, therefor Column 31, Line 4: In Claim 11, delete "components'and" and insert -- components and --, therefor Signed and Sealed this
Thirtieth Day of July, 2013

Teresa Stanek Rea
*Acting Director of the United States Patent and Trademark Office*